US009629117B2

(12) United States Patent
Bajko

(10) Patent No.: US 9,629,117 B2
(45) Date of Patent: Apr. 18, 2017

(54) METHOD, APPARATUS, AND COMPUTER PROGRAM PRODUCT FOR LOCATION DETERMINATION USING WIFI

(71) Applicant: Nokia Technologies Oy, Espoo (FI)

(72) Inventor: Gabor Bajko, Santa Clara, CA (US)

(73) Assignee: Nokia Technologies Oy, Espoo (FI)

( * ) Notice: Subject to any disclaimer, the term of this patent is extended or adjusted under 35 U.S.C. 154(b) by 98 days.

(21) Appl. No.: 14/574,267

(22) Filed: Dec. 17, 2014

(65) Prior Publication Data

US 2015/0181552 A1    Jun. 25, 2015

Related U.S. Application Data

(60) Provisional application No. 61/918,223, filed on Dec. 19, 2013.

(51) Int. Cl.
*H04W 24/00* (2009.01)
*H04W 64/00* (2009.01)

(52) U.S. Cl.
CPC .................... *H04W 64/00* (2013.01)

(58) Field of Classification Search
CPC ....... H04W 64/00; H04W 4/02; H04W 4/027; H04W 24/08; G01S 5/009
USPC ................................... 370/252, 338
See application file for complete search history.

(56) References Cited

U.S. PATENT DOCUMENTS

| 5,245,587 | A | 9/1993 | Hutson |
| 8,150,344 | B1 | 4/2012 | Goyal et al. |
| 8,217,368 | B2 | 7/2012 | Meyers et al. |
| 2004/0128331 | A1 | 7/2004 | Hinds |
| 2005/0107110 | A1* | 5/2005 | Vasudevan ............ H04W 36/34 455/525 |
| 2006/0176849 | A1 | 8/2006 | Gass |
| 2007/0147519 | A1 | 6/2007 | Takayama et al. |
| 2008/0057978 | A1 | 3/2008 | Karaoguz et al. |
| 2008/0130604 | A1 | 6/2008 | Boyd |
| 2008/0161011 | A1 | 7/2008 | Babin et al. |

(Continued)

OTHER PUBLICATIONS

Search Report received for corresponding United Kingdom Patent Application No. 1322659.2, dated Apr. 25, 2014, 4 pages.

(Continued)

*Primary Examiner* — Muthuswamy Manoharan
(74) *Attorney, Agent, or Firm* — Locke Lord LLP

(57) ABSTRACT

Method, apparatus, and computer program product for wireless position determination. According to an example embodiment, location determination of a mobile device may be performed by network elements using RSSI and/or RCPI of a mobile device measured beacon from each of a plurality of access point devices. Location determination of a mobile device may be performed by network elements using WiFi Timing Measurement Action Frames to enable receiving the location of the mobile device, derived from flight times of respective signals over a plurality of the signal paths for a plurality of access point devices connected in a common network. Location determination may be performed by a mobile device using WiFi Timing Measurement Request Frames to enable receiving the location of the mobile device, derived from flight times of signal paths for a plurality of access point devices that are not connected in a common network.

11 Claims, 17 Drawing Sheets

(56) References Cited

U.S. PATENT DOCUMENTS

| | | | | |
|---|---|---|---|---|
| 2010/0167731 A1* | 7/2010 | Horodezky | ............ | H04W 48/16 |
| | | | | 455/434 |
| 2014/0093005 A1 | 4/2014 | Xia et al. | | |
| 2014/0347985 A1* | 11/2014 | Yi | .......................... | H04W 76/02 |
| | | | | 370/230 |
| 2015/0092584 A1* | 4/2015 | Jung | ..................... | H04W 52/00 |
| | | | | 370/252 |

OTHER PUBLICATIONS

"IEEE Standard for Information Technology-Telecommunications and Information Exchange Between Systems Local and Metropolitan Area Networks-Specific Requirements-Part 11: Wireless LAN Medium Access Control(MAC) and Physical Layer (PHY) Specifications", IEEE Std 802.11, Mar. 29, 2012, 2793 Pages.

"Wi-Fi Protected Setup Specification", Wi-Fi Alliance, Version 1.0h, Dec. 2006, pp. 1-110.

"Wi-Fi Simple Configuration Protocol and Usability Best Practices for the Wi-Fi Protected Setup™ Program", Wi-Fi Alliance, Version 2.0.1, Apr. 2011, pp. 1-30.

"Wi-Fi Direct", Wi-Fi Alliance, Oct. 2010, pp. 1-14.

Golyandina et al; Analysis of Time Series Structure SSA and Related Techniques; CRC Press, 2001.

* cited by examiner

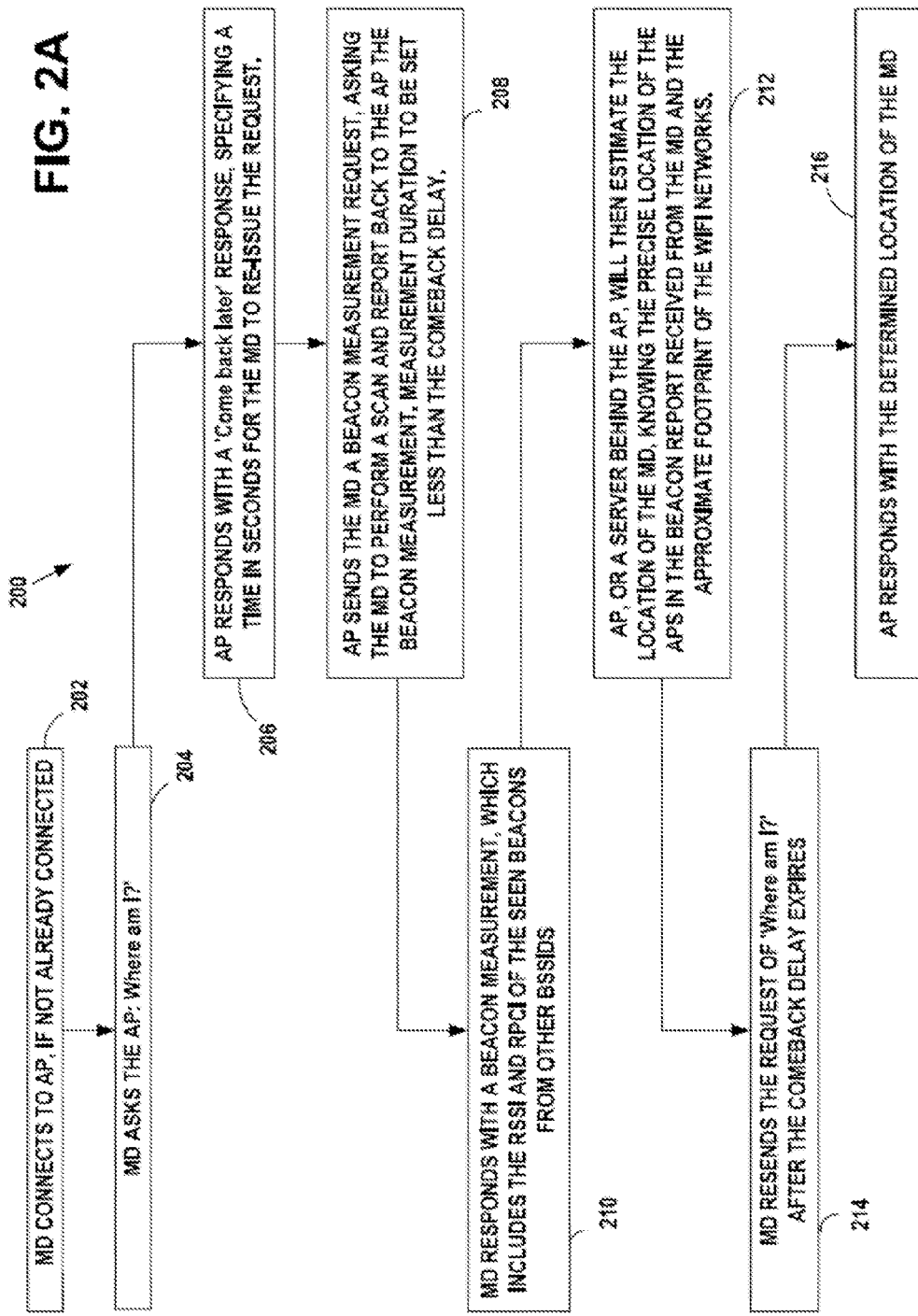

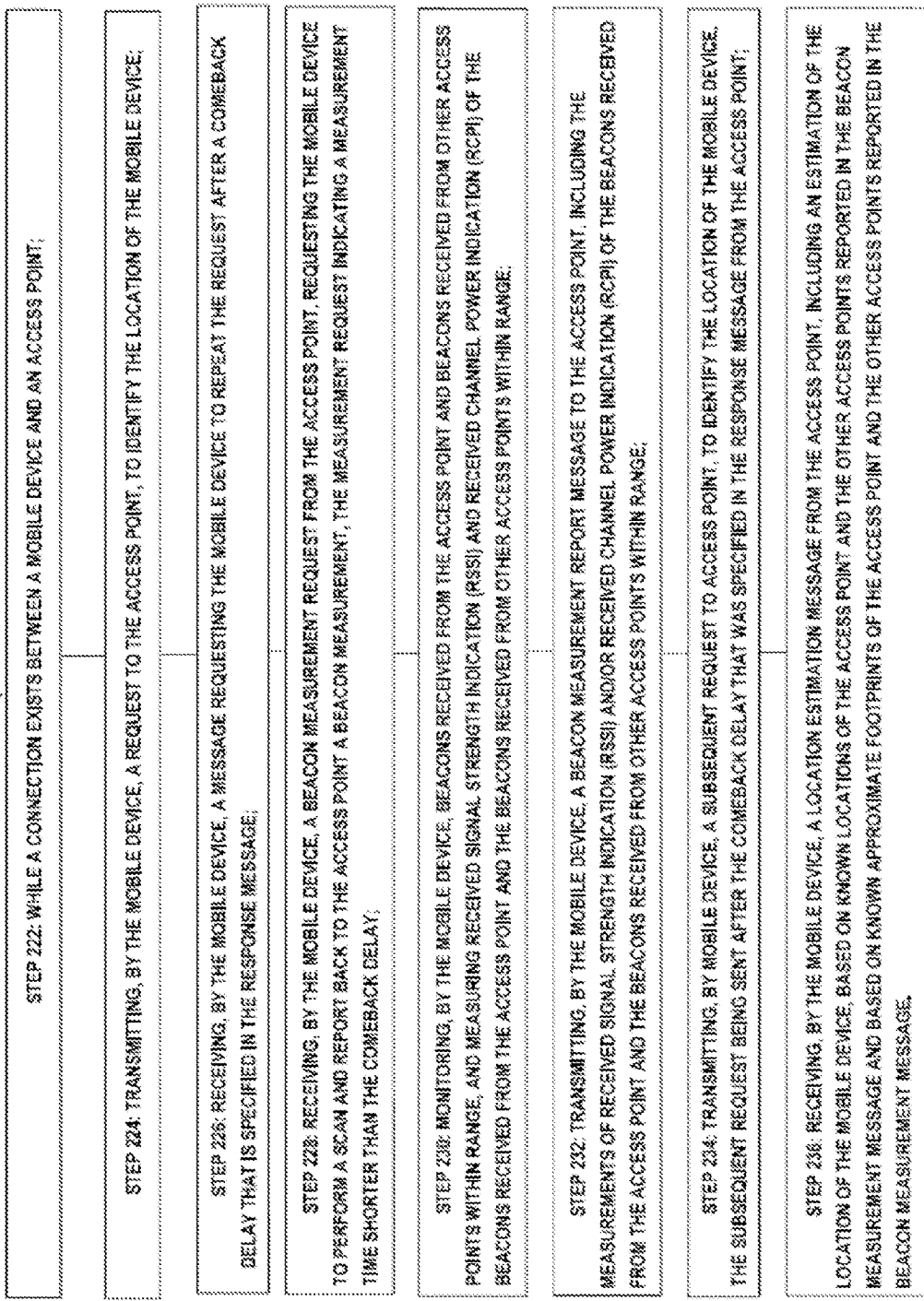

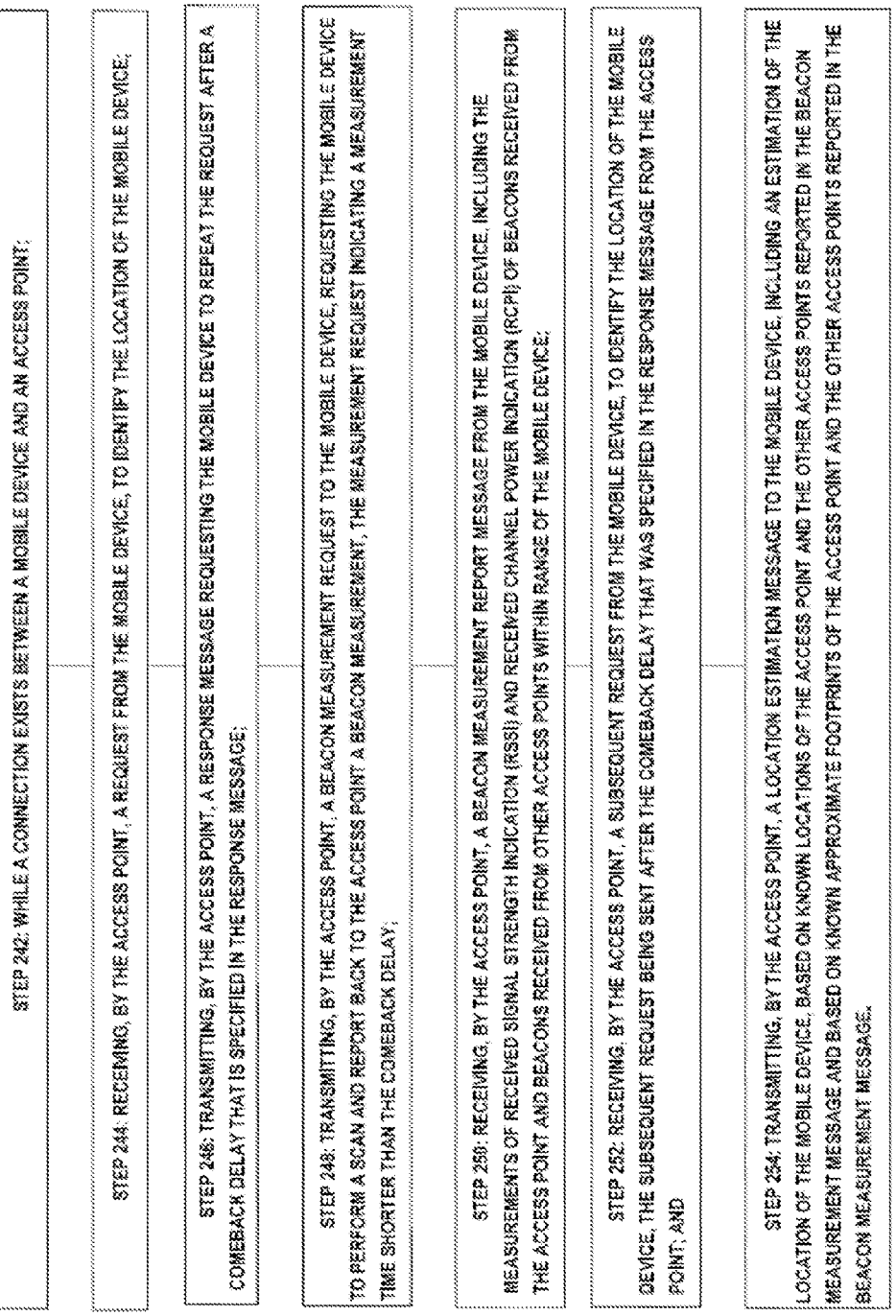

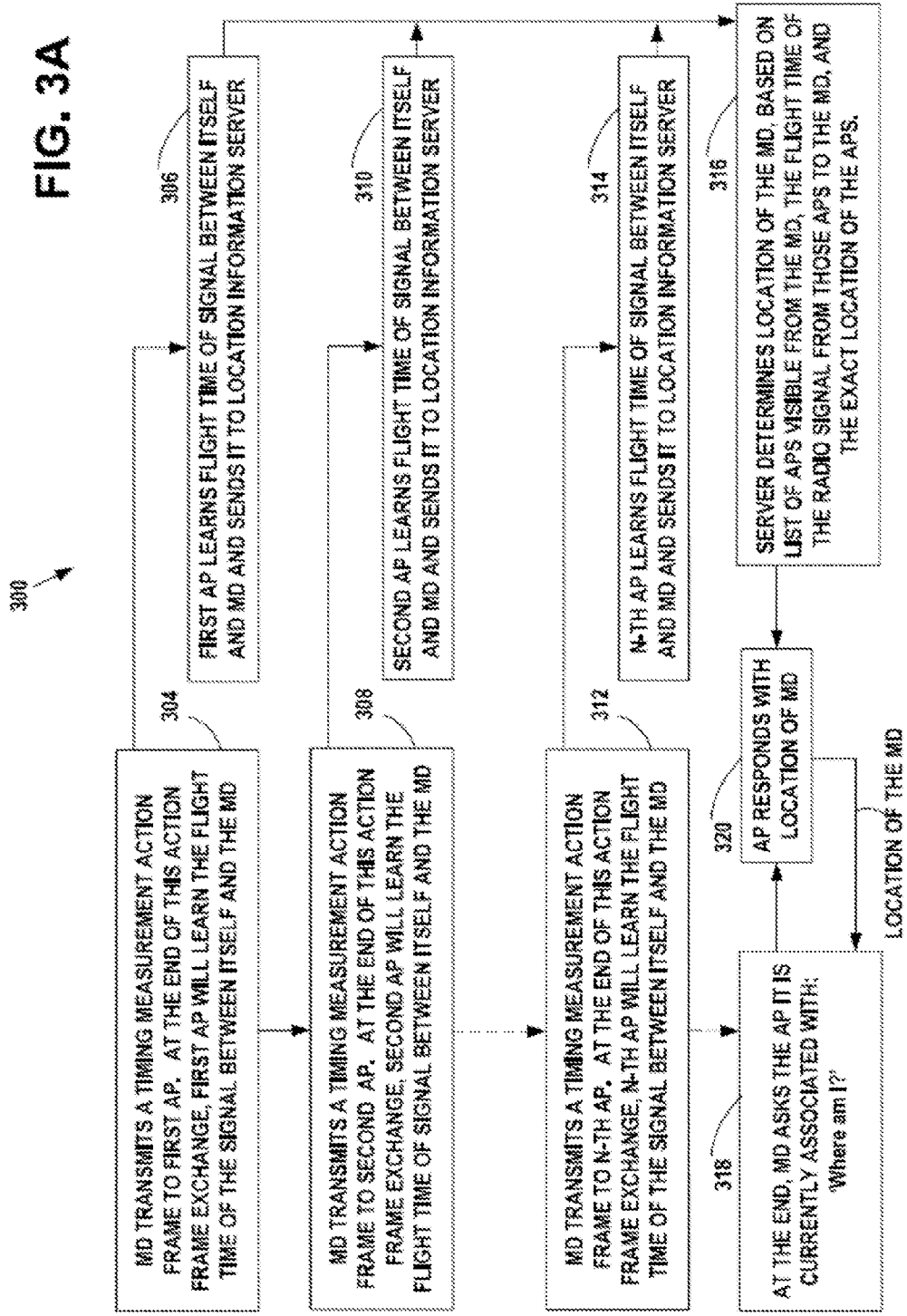

STEP 342: TRANSMITTING, BY A MOBILE DEVICE, TO A FIRST ACCESS POINT A TIMING MEASUREMENT ACTION FRAME TO THE FIRST ACCESS POINT, TO ENABLE THE FIRST ACCESS POINT TO MEASURE A FIRST FLIGHT TIME OF A SIGNAL BETWEEN THE FIRST ACCESS POINT AND THE MOBILE DEVICE, FOR STORAGE OF THE FIRST MEASURED FLIGHT TIME IN A SERVER;

STEP 344: TRANSMITTING, BY THE A MOBILE DEVICE, TO A SECOND ACCESS POINT A TIMING MEASUREMENT ACTION FRAME TO A SECOND ACCESS POINT, TO ENABLE THE SECOND ACCESS POINT TO MEASURE A SECOND FLIGHT TIME OF A SIGNAL BETWEEN THE SECOND ACCESS POINT AND THE MOBILE DEVICE, FOR STORAGE OF THE SECOND MEASURED FLIGHT TIME IN THE SERVER;

STEP 346: TRANSMITTING, BY THE MOBILE DEVICE, A REQUEST TO A CURRENTLY CONNECTED ACCESS POINT COUPLED TO THE SERVER, TO IDENTIFY THE LOCATION OF THE MOBILE DEVICE; AND

STEP 348: RECEIVING, BY THE MOBILE DEVICE, FROM A CURRENTLY CONNECTED ACCESS POINT, A DETERMINED LOCATION OF THE MOBILE DEVICE, BASED ON AT LEAST THE FIRST AND SECOND FLIGHT TIMES OF SIGNALS FROM AT LEAST THE FIRST AND SECOND ACCESS POINTS, RESPECTIVELY, TO THE MOBILE DEVICE, AND THE LOCATIONS OF AT LEAST THE FIRST AND SECOND THE ACCESS POINTS.

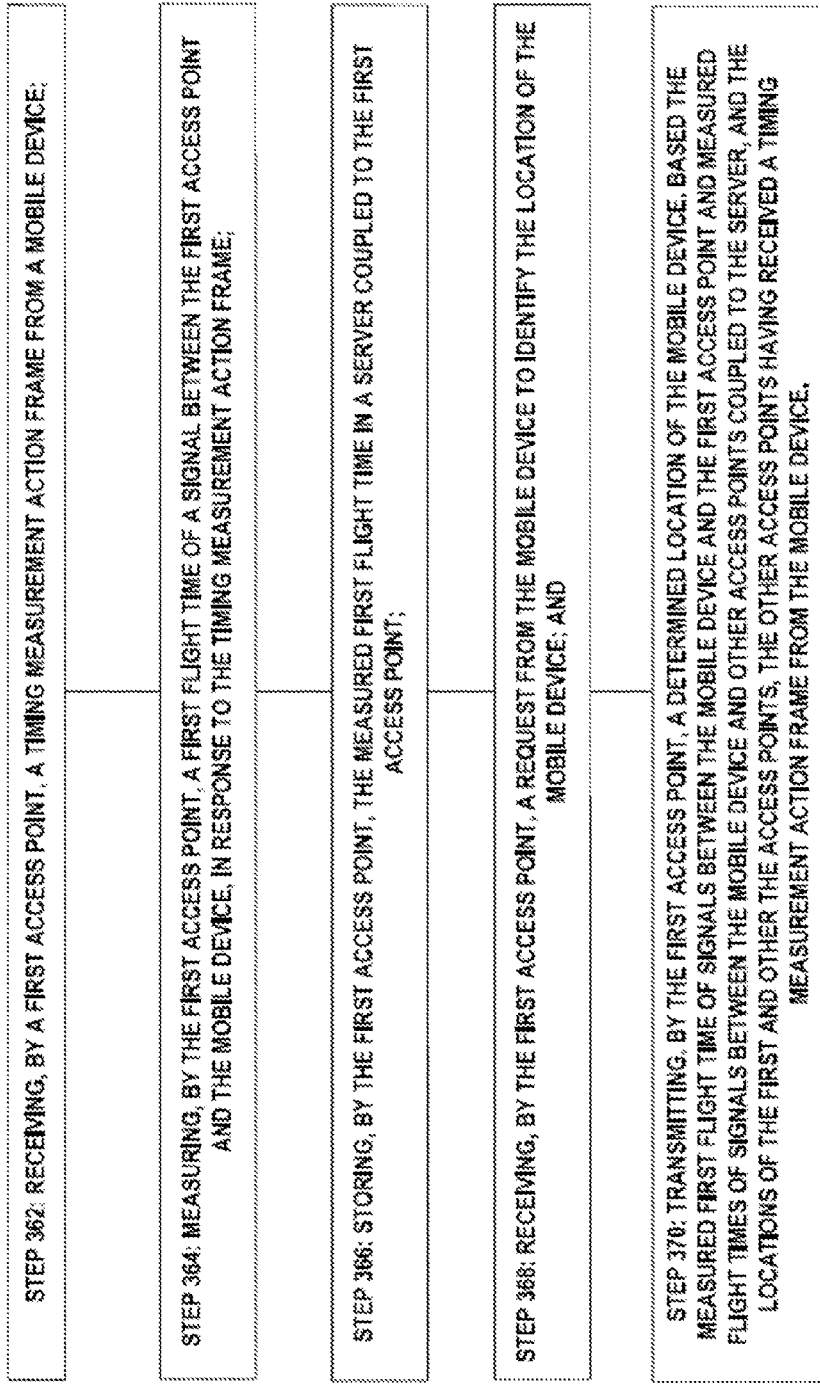

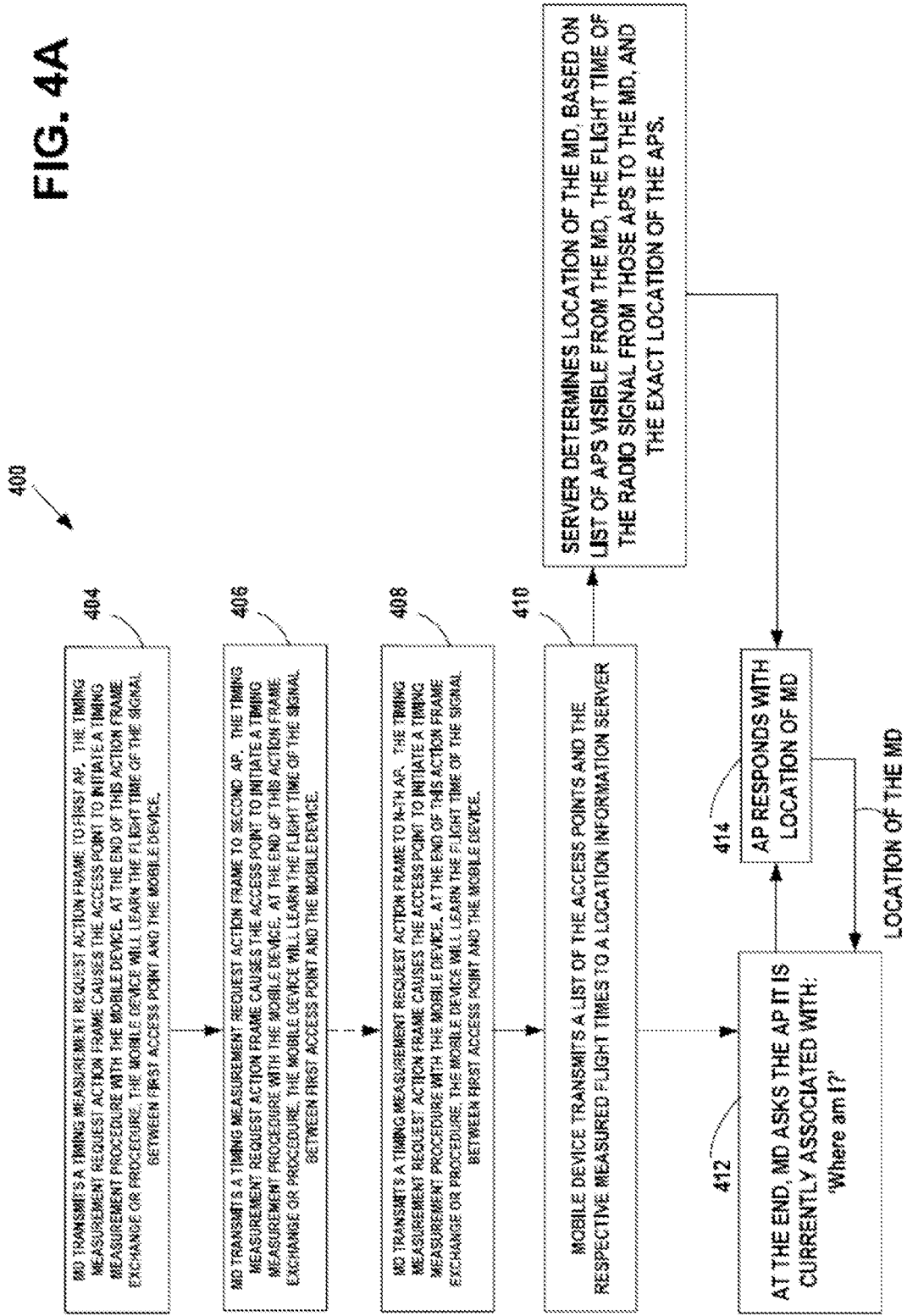

STEP 442: TRANSMITTING, BY A MOBILE DEVICE, TO A FIRST ACCESS POINT A TIMING MEASUREMENT REQUEST FRAME, TO ENABLE THE MOBILE DEVICE TO MEASURE A FIRST FLIGHT TIME OF A SIGNAL BETWEEN THE FIRST ACCESS POINT AND THE MOBILE DEVICE;

STEP 444: TRANSMITTING, BY THE MOBILE DEVICE, TO A SECOND ACCESS POINT A TIMING MEASUREMENT REQUEST FRAME, TO ENABLE THE MOBILE DEVICE TO MEASURE A SECOND FLIGHT TIME OF A SIGNAL BETWEEN THE SECOND ACCESS POINT AND THE MOBILE DEVICE;

STEP 446: TRANSMITTING, BY THE MOBILE DEVICE, A LIST OF AT LEAST THE FIRST AND SECOND ACCESS POINTS AND THE RESPECTIVE FIRST AND SECOND MEASURED FLIGHT TIMES, TO A LOCATION INFORMATION SERVER THAT WILL THEN DETERMINE THE LOCATION OF THE MOBILE DEVICE;

STEP 448: TRANSMITTING, BY THE MOBILE DEVICE, A REQUEST TO A CURRENTLY CONNECTED ACCESS POINT THAT IS COUPLED TO THE LOCATION INFORMATION SERVER, TO IDENTIFY THE LOCATION OF THE MOBILE DEVICE; AND

STEP 450: RECEIVING, BY THE MOBILE DEVICE, FROM THE CURRENTLY CONNECTED ACCESS POINT, THE DETERMINED LOCATION OF THE MOBILE DEVICE, BASED ON AT LEAST THE FIRST AND SECOND FLIGHT TIMES OF SIGNALS FROM AT LEAST THE FIRST AND SECOND ACCESS POINTS, RESPECTIVELY, TO THE MOBILE DEVICE, AND LOCATIONS OF AT LEAST THE FIRST AND SECOND THE ACCESS POINTS.

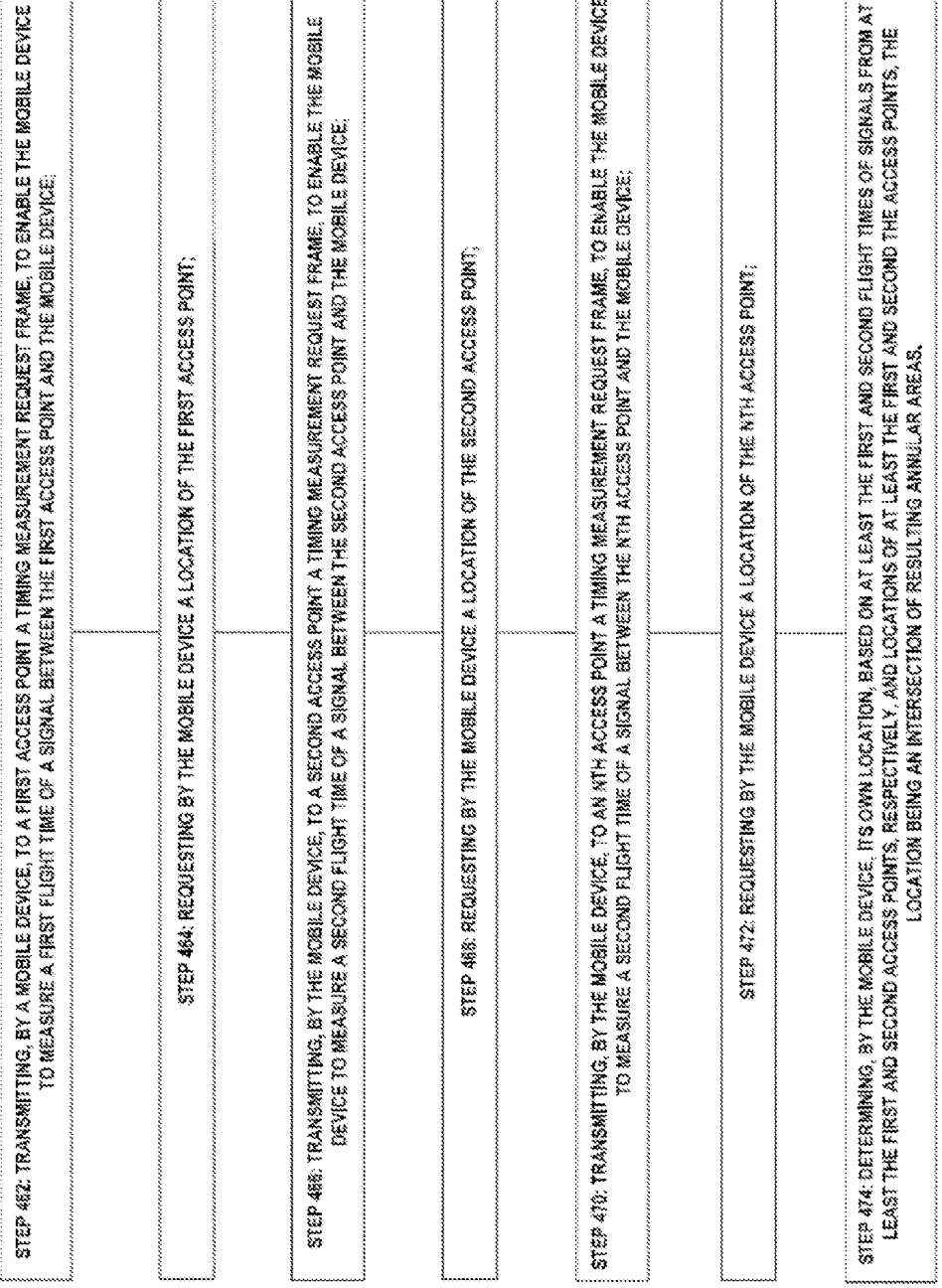

METHOD, APPARATUS, AND COMPUTER PROGRAM PRODUCT FOR LOCATION DETERMINATION USING WIFI

FIELD

The field of the invention relates to electronic positioning, and more particularly to wireless position determination.

BACKGROUND

Modern society has adopted, and is becoming reliant upon, wireless communication devices for various purposes, such as connecting users of the wireless communication devices with other users. Wireless communication devices can vary from battery powered handheld devices to stationary household and/or commercial devices utilizing an electrical network as a power source. Due to rapid development of the wireless communication devices, a number of areas capable of enabling entirely new types of communication applications have emerged.

Cellular networks facilitate communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHZ/1.8 GHZ bands in Europe and at 850 MHz and 1.9 GHZ in the United States. While long-range communication networks, like GSM, are a well-accepted means for transmitting and receiving data, due to cost, traffic and legislative concerns, these networks may not be appropriate for all data applications.

Short-range communication technologies provide communication solutions that avoid some of the problems seen in large cellular networks. Bluetooth™ is an example of a short-range wireless technology quickly gaining acceptance in the marketplace. In addition to Bluetooth™ other popular short-range communication technologies include Bluetooth™ Low Energy, IEEE 802.11 wireless local area network (WLAN), Wireless USB (WUSB), Ultra Wideband (UWB), ZigBee (IEEE 802.15.4, IEEE 802.15.4a), and ultra-high frequency radio frequency identification (UHF RFID) technologies. All of these wireless communication technologies have features and advantages that make them appropriate for various applications.

At least one communication-related application currently being offered in various forms is electronic positioning. Basic electronic positioning may provide the current location of a device in terms of a footprint and associated GPS location based techniques. WiFi is used in an indirect way to determine the location of a mobile device (MD). WiFi network footprints are collected in a centralized database, the footprint is associated with a GPS location, and then uploaded to a Location Information Server (LIS). When a mobile device scans for WiFi beacons, it reads the MAC address of the beacon and sends it to the Location Information Server. The Location Information Server will then provide an approximate location to the mobile device.

What is needed is a location determination method that does not depend on a GPS location of the original observer where a previous WiFi beacon was originally seen, which is not an accurate measure of the current location of the mobile device. Even if multiple access points were identified and triangulation were used based on the GPS coordinates of the previous observer, this would not improve the accuracy of the measurement of the current location of the mobile device.

What is needed is a location determination method that enables a WiFi network to provide to the mobile device, its current location.

Where there are WiFi hotspots that are operated by diverse service providers that do not share a common database, what is needed is a location determination method that does not depend on a single centralized database.

SUMMARY

Method, apparatus, and computer program product example embodiments provide wireless position determination.

In an example embodiment of the invention, a method comprises:

transmitting, by the mobile device, a request to the access point, to identify the location of the mobile device;

receiving, by the mobile device, a message requesting the mobile device to repeat the request after a comeback delay that is specified in the response message;

receiving, by the mobile device, a beacon measurement request from the access point, requesting the mobile device to perform a scan and report back to the access point a beacon measurement, the measurement request indicating a measurement time shorter than the comeback delay;

monitoring, by the mobile device, beacons received from the access point and beacons received from other access points within range, and measuring received signal strength indication (RSSI) and received channel power indication (RCPI) of the beacons received from the access point and the beacons received from other access points within range;

transmitting, by the mobile device, a beacon measurement report message to the access point, including the measurements of received signal strength indication (RSSI) and/or received channel power indication (RCPI) of the beacons received from the access point and the beacons received from other access points within range;

transmitting, by the mobile device, a subsequent request to the access point, to identify the location of the mobile device, the subsequent request being sent after the comeback delay that was specified in the response message from the access point;

receiving, by the mobile device, a location estimation message from the access point, including an estimation of the location of the mobile device, based on known locations of the access point and the other access points reported in the beacon measurement message and based on known approximate footprints of the access point and the other access points reported in the beacon measurement message.

In an example embodiment of the invention, a method comprises:

while a connection exists between a mobile device and an access point;

receiving, by the access point, a request from the mobile device, to identify the location of the mobile device;

transmitting, by the access point, a response message requesting the mobile device to repeat the request after a comeback delay that is specified in the response message;

transmitting, by the access point, a beacon measurement request to the mobile device, requesting the mobile device to perform a scan and report back to the access point a beacon measurement, the measurement request indicating a measurement time shorter than the comeback delay;

receiving, by the access point, a beacon measurement report message from the mobile device, including the measurements of received signal strength indication (RSSI) and/or received channel power indication (RCPI) of beacons received from the access point and beacons received from other access points within range of the mobile device;

receiving, by the access point, a subsequent request from the mobile device, to identify the location of the mobile device, the subsequent request being sent after the comeback delay that was specified in the response message from the access point; and transmitting, by the access point, a location estimation message to the mobile device, including an estimation of the location of the mobile device, based on known locations of the access point and the other access points reported in the beacon measurement message and based on known approximate footprints of the access point and the other access points reported in the beacon measurement message.

An example embodiment of the invention, a method comprises:

transmitting, by a mobile device, to a first access point a Timing measurement action frame, to enable the first access point to measure a first flight time of a signal between the first access point and the mobile device, for storage of the first measured flight time in a server;

transmitting, by the a mobile device, to a second access point a Timing measurement action frame, to enable the second access point to measure a second flight time of a signal between the second access point and the mobile device, for storage of the second measured flight time in the server;

transmitting, by the mobile device, a request to a currently connected access point coupled to the server, to identify the location of the mobile device; and receiving, by the mobile device, from the currently connected access point, a determined location of the mobile device, based on at least the first and second flight times of signals from at least the first and second access points, respectively, to the mobile device, and the locations of at least the first and second the access points.

In an example embodiment of the invention, a method comprises: receiving, by a first access point, a Timing measurement action frame from a mobile device;

measuring, by the first access point, a first flight time of a signal between the first access point and the mobile device, in response to the Timing measurement action frame;

storing, by the first access point, the measured first flight time in a server coupled to the first access point;

receiving, by the first access point, a request from the mobile device to identify the location of the mobile device; and transmitting, by the first access point, a determined location of the mobile device, based on the measured first flight time of signals between the mobile device and the first access point and measured flight times of signals between the mobile device and other access points coupled to the server, and the locations of the first and other the access points, the other access points having received a Timing measurement action frame from the mobile device.

In an example embodiment of the invention, a method comprises:

transmitting, by a mobile device, to a first access point a timing measurement request frame, to enable the mobile device to measure a first flight time of a signal between the first access point and the mobile device;

transmitting, by the mobile device, to a second access point a timing measurement request frame, to enable the mobile device to measure a second flight time of a signal between the second access point and the mobile device;

transmitting, by the mobile device, a list of at least the first and second access points and the respective first and second measured flight times, to a location information server that will then determine the location of the mobile device;

transmitting, by the mobile device, a request to a currently connected access point that is coupled to the location information server, to identify the location of the mobile device; and receiving, by the mobile device, from the currently connected access point, the determined location of the mobile device, based on at least the first and second flight times of signals from at least the first and second access points, respectively, to the mobile device, and locations of at least the first and second the access points.

In an example embodiment of the invention, an apparatus comprises:

at least one processor;

at least one memory including computer program code;

the at least one memory and the computer program code configured to, with the at least one processor, cause the apparatus at least to:

transmit a request to the access point, to identify the location of the mobile device;

receive a message requesting the mobile device to repeat the request after a comeback delay that is specified in the response message;

receive a beacon measurement request from the access point, requesting the mobile device to perform a scan and report back to the access point a beacon measurement, the measurement request indicating a measurement time shorter than the comeback delay;

monitor beacons received from the access point and beacons received from other access points within range, and measuring received signal strength indication (RSSI) and received channel power indication (RCPI) of the beacons received from the access point and the beacons received from other access points within range;

transmit a beacon measurement report message to the access point, including the measurements of received signal strength indication (RSSI) and/or received channel power indication (RCPI) of the beacons received from the access point and the beacons received from other access points within range;

transmit a subsequent request to the access point, to identify the location of the mobile device, the subsequent request being sent after the comeback delay that was specified in the response message from the access point;

receive a location estimation message from the access point, including an estimation of the location of the mobile device, based on known locations of the access point and the other access points reported in the beacon measurement message and based on known approximate footprints of the access point and the other access points reported in the beacon measurement message.

In an example embodiment of the invention, an apparatus comprises:

at least one processor;

at least one memory including computer program code;

the at least one memory and the computer program code configured to, with the at least one processor, cause the apparatus at least to:

receive a request from the mobile device, to identify the location of the mobile device;

transmit a response message requesting the mobile device to repeat the request after a comeback delay that is specified in the response message;

transmit a beacon measurement request to the mobile device, requesting the mobile device to perform a scan and report back to the access point a beacon measurement, the measurement request indicating a measurement time shorter than the comeback delay;

receive a beacon measurement report message from the mobile device, including the measurements of received signal strength indication (RSSI) and/or received channel power indication (RCPI) of beacons received from the access point and beacons received from other access points within range of the mobile device;

receive a subsequent request from the mobile device, to identify the location of the mobile device, the subsequent request being sent after the comeback delay that was specified in the response message from the access point; and transmit a location estimation message to the mobile device, including an estimation of the location of the mobile device, based on known locations of the access point and the other access points reported in the beacon measurement message and based on known approximate footprints of the access point and the other access points reported in the beacon measurement message.

In an example embodiment of the invention, an apparatus comprises:

at least one processor;
at least one memory including computer program code;
the at least one memory and the computer program code configured to, with the at least one processor, cause the apparatus at least to:

transmit to a first access point a Timing measurement action frame, to enable the first access point to measure a first flight time of a signal between the first access point and the mobile device, for storage of the first measured flight time in a server;

transmit to a second access point a Timing measurement action frame, to enable the second access point to measure a second flight time of a signal between the second access point and the mobile device, for storage of the second measured flight time in the server;

transmit a request to a currently connected access point coupled to the server, to identify the location of the mobile device; and receive from the currently connected access point, a determined location of the mobile device, based on at least the first and second flight times of signals from at least the first and second access points, respectively, to the mobile device, and the locations of at least the first and second the access points.

In an example embodiment of the invention, an apparatus comprises:

at least one processor;
at least one memory including computer program code;
the at least one memory and the computer program code configured to, with the at least one processor, cause the apparatus at least to:

receive a Timing measurement action frame from a mobile device;

measure a first flight time of a signal between the first access point and the mobile device, in response to the Timing measurement action frame;

store the measured first flight time in a server coupled to the first access point;

receive a request from the mobile device to identify the location of the mobile device; and transmit a determined location of the mobile device, based on the measured first flight time of signals between the mobile device and the first access point and measured flight times of signals between the mobile device and other access points coupled to the server, and the locations of the first and other the access points, the other access points having received a Timing measurement action frame from the mobile device.

In an example embodiment of the invention, an apparatus comprises:

at least one processor;
at least one memory including computer program code;
the at least one memory and the computer program code configured to, with the at least one processor, cause the apparatus at least to:

transmit to a first access point a timing measurement request frame, to enable the mobile device to measure a first flight time of a signal between the first access point and the mobile device;

transmit to a second access point a timing measurement request frame, to enable the mobile device to measure a second flight time of a signal between the second access point and the mobile device;

transmit a list of at least the first and second access points and the respective first and second measured flight times, to a location information server that will then determine the location of the mobile device;

transmit a request to a currently connected access point that is coupled to the location information server, to identify the location of the mobile device; and receive from the currently connected access point, the determined location of the mobile device, based on at least the first and second flight times of signals from at least the first and second access points, respectively, to the mobile device, and locations of at least the first and second the access points.

In an example embodiment of the invention, a computer program product comprising computer executable program code recorded on a computer readable non-transitory storage medium, the computer executable program code comprising:

code for transmitting, by the mobile device, a request to the access point, to identify the location of the mobile device;

code for receiving, by the mobile device, a message requesting the mobile device to repeat the request after a comeback delay that is specified in the response message;

code for receiving, by the mobile device, a beacon measurement request from the access point, requesting the mobile device to perform a scan and report back to the access point a beacon measurement, the measurement request indicating a measurement time shorter than the comeback delay;

code for monitoring, by the mobile device, beacons received from the access point and beacons received from other access points within range, and measuring received signal strength indication (RSSI) and received channel power indication (RCPI) of the beacons received from the access point and the beacons received from other access points within range;

code for transmitting, by the mobile device, a beacon measurement report message to the access point, including the measurements of received signal strength indication (RSSI) and/or received channel power indication (RCPI) of the beacons received from the access point and the beacons received from other access points within range;

code for transmitting, by the mobile device, a subsequent request to the access point, to identify the location of the mobile device, the subsequent request being sent after the comeback delay that was specified in the response message from the access point;

code for receiving, by the mobile device, a location estimation message from the access point, including an estimation of the location of the mobile device, based on known locations of the access point and the other access points reported in the beacon measurement message and based on known approximate footprints of the access point and the other access points reported in the beacon measurement message.

In an example embodiment of the invention, a computer program product comprising computer executable program code recorded on a computer readable non-transitory storage medium, the computer executable program code comprising:

while a connection exists between a mobile device and an access point;

code for receiving, by the access point, a request from the mobile device, to identify the location of the mobile device;

code for transmitting, by the access point, a response message requesting the mobile device to repeat the request after a comeback delay that is specified in the response message;

code for transmitting, by the access point, a beacon measurement request to the mobile device, requesting the mobile device to perform a scan and report back to the access point a beacon measurement, the measurement request indicating a measurement time shorter than the comeback delay;

code for receiving, by the access point, a beacon measurement report message from the mobile device, including the measurements of received signal strength indication (RSSI) and/or received channel power indication (RCPI) of beacons received from the access point and beacons received from other access points within range of the mobile device;

code for receiving, by the access point, a subsequent request from the mobile device, to identify the location of the mobile device, the subsequent request being sent after the comeback delay that was specified in the response message from the access point; and code for transmitting, by the access point, a location estimation message to the mobile device, including an estimation of the location of the mobile device, based on known locations of the access point and the other access points reported in the beacon measurement message and based on known approximate footprints of the access point and the other access points reported in the beacon measurement message.

In an example embodiment of the invention, a computer program product comprising computer executable program code recorded on a computer readable non-transitory storage medium, the computer executable program code comprising:

code for transmitting, by a mobile device, to a first access point a Timing measurement action frame, to enable the first access point to measure a first flight time of a signal between the first access point and the mobile device, for storage of the first measured flight time in a server;

code for transmitting, by the a mobile device, to a second access point a Timing measurement action frame, to enable the second access point to measure a second flight time of a signal between the second access point and the mobile device, for storage of the second measured flight time in the server;

code for transmitting, by the mobile device, a request to a currently connected access point coupled to the server, to identify the location of the mobile device; and code for receiving, by the mobile device, from the currently connected access point, a determined location of the mobile device, based on at least the first and second flight times of signals from at least the first and second access points, respectively, to the mobile device, and the locations of at least the first and second the access points.

In an example embodiment of the invention, a computer program product comprising computer executable program code recorded on a computer readable non-transitory storage medium, the computer executable program code comprising:

code for receiving, by a first access point, a Timing measurement action frame from a mobile device;

code for measuring, by the first access point, a first flight time of a signal between the first access point and the mobile device, in response to the Timing measurement action frame;

code for storing, by the first access point, the measured first flight time in a server coupled to the first access point;

code for receiving, by the first access point, a request from the mobile device to identify the location of the mobile device; and code for transmitting, by the first access point, a determined location of the mobile device, based on the measured first flight time of signals between the mobile device and the first access point and measured flight times of signals between the mobile device and other access points coupled to the server, and the locations of the first and other the access points, the other access points having received a Timing measurement action frame from the mobile device.

In an example embodiment of the invention, a computer program product comprising computer executable program code recorded on a computer readable non-transitory storage medium, the computer executable program code comprising:

code for transmitting, by a mobile device, to a first access point a timing measurement request frame, to enable the mobile device to measure a first flight time of a signal between the first access point and the mobile device;

code for transmitting, by the mobile device, to a second access point a timing measurement request frame, to enable the mobile device to measure a second flight time of a signal between the second access point and the mobile device;

code for transmitting, by the mobile device, a list of at least the first and second access points and the respective first and second measured flight times, to a location information server that will then determine the location of the mobile device;

code for transmitting, by the mobile device, a request to a currently connected access point that is coupled to the location information server, to identify the location of the mobile device; and code for receiving, by the mobile device, from the currently connected access point, the determined location of the mobile device, based on at least the first and second flight times of signals from at least the first and second access points, respectively, to the mobile device, and locations of at least the first and second the access points.

In an example embodiment of the invention, a method comprises:

transmitting, by a mobile device, to a first access point a timing measurement request frame, to enable the mobile device to measure a first flight time of a signal between the first access point and the mobile device;

requesting by the mobile device a location of the first access point;

transmitting, by the mobile device, to a second access point a timing measurement request frame, to enable the mobile device to measure a second flight time of a signal between the second access point and the mobile device;

requesting by the mobile device a location of the second access point;

transmitting, by the mobile device, to an Nth access point a timing measurement request frame, to enable the mobile device to measure a second flight time of a signal between the Nth access point and the mobile device;

requesting by the mobile device a location of the Nth access point;

determining, by the mobile device, its own location, based on at least the first and second flight times of signals from at least the first and second access points, respectively, and locations of at least the first and second the access points, the location being an intersection of resulting annular areas.

In an example embodiment of the invention, an apparatus comprises:

at least one processor;

at least one memory including computer program code;

the at least one memory and the computer program code configured to, with the at least one processor, cause the apparatus at least to:

transmit to a first access point a timing measurement request frame, to enable the mobile device to measure a first flight time of a signal between the first access point and the mobile device;

request a location of the first access point;

transmit to a second access point a timing measurement request frame, to enable the mobile device to measure a second flight time of a signal between the second access point and the mobile device;

request a location of the second access point;

transmit to an Nth access point a timing measurement request frame, to enable the mobile device to measure a second flight time of a signal between the Nth access point and the mobile device;

request a location of the Nth access point;

determine its own location, based on at least the first and second flight times of signals from at least the first and second access points, respectively, and locations of at least the first and second the access points, the location being an intersection of resulting annular areas.

In an example embodiment of the invention, a computer program product comprising computer executable program code recorded on a computer readable non-transitory storage medium, the computer executable program code comprising:

code for transmitting, by a mobile device, to a first access point a timing measurement request frame, to enable the mobile device to measure a first flight time of a signal between the first access point and the mobile device;

code for requesting by the mobile device a location of the first access point;

code for transmitting, by the mobile device, to a second access point a timing measurement request frame, to enable the mobile device to measure a second flight time of a signal between the second access point and the mobile device;

code for requesting by the mobile device a location of the second access point;

code for transmitting, by the mobile device, to an Nth access point a timing measurement request frame, to enable the mobile device to measure a second flight time of a signal between the Nth access point and the mobile device;

code for requesting by the mobile device a location of the Nth access point;

code for determining, by the mobile device, its own location, based on at least the first and second flight times of signals from at least the first and second access points, respectively, and locations of at least the first and second the access points, the location being an intersection of resulting annular areas.

The example embodiments of the invention provide wireless position determination.

DESCRIPTION OF THE FIGURES

FIG. 2A illustrates the flow diagram 200 of an example embodiment of the invention for Location Determination Using WiFi Received Signal Strength Indicator (RSSI) and/or received channel power indicator (RCPI).

FIG. 2C illustrates an example embodiment of the invention, depicting an example flow diagram 220 of an example method of Location Determination Using WiFi RSSI and/or RCPI, from the point of view of the mobile wireless device 100, in accordance with at least one embodiment of the present invention.

FIG. 2D illustrates an example embodiment of the invention, depicting an example flow diagram 240 of an example method of Location Determination Using WiFi RSSI and/or RCPI, from the point of view of the access point device 150A, in accordance with at least one embodiment of the present invention.

FIG. 3A illustrates the flow diagram 300 of an example embodiment of the invention for Location Determination Using WiFi Timing Measurement Action Frame.

FIG. 3D illustrates an example embodiment of the invention, depicting an example flow diagram 340 of an example method of Location Determination Using WiFi Timing Measurement Action Frame, from the point of view of the mobile wireless device 100, in accordance with at least one embodiment of the present invention.

FIG. 3E illustrates an example embodiment of the invention, depicting an example flow diagram 360 of an example method of Location Determination Using WiFi Timing Measurement Action Frame, from the point of view of the access point device 150A, in accordance with at least one embodiment of the present invention.

FIG. 4A illustrates the flow diagram 400 of an example embodiment of the invention for Location Determination Using WiFi Timing Measurement Request Frame.

FIG. 4D illustrates an example embodiment of the invention, depicting an example flow diagram 440 of an example method of Location Determination Using WiFi Timing Measurement Request Frame, from the point of view of the mobile wireless device 100, in accordance with at least one embodiment of the present invention.

FIG. 4E illustrates an example embodiment of the invention, depicting an example flow diagram 460 of an example method of Location Determination Using WiFi Timing Measurement Request Frame, from the point of view of the mobile wireless device 100, wherein the mobile device calculates its location using the location of the access points and the annular areas determined from the flight time measurements, wherein the resulting location of the mobile device is the intersection of the annular areas, in accordance with at least one embodiment of the present invention.

DETAILED DESCRIPTION

Indoor positioning and navigation may be useful applications for smartphones, to support social location-based services and advertisement use cases. In marketing and advertising, data and observations about user locations and activities in malls, shopping centers, airports and the like, may provide useful information for user behavior analysis and other statistical data products derived from crowd-sourced user data. These applications may stimulate further refinements in indoor navigation and positioning accuracy.

In accordance with an example embodiment of the invention, Location Determination may be performed by a mobile device using received signal strength indication (RSSI) and/or a received channel power indication (RCPI) of a measured beacon from each of a plurality of access point devices.

In accordance with another example embodiment of the invention, Location Determination may be performed by a mobile device initiating a Timing Measurement procedure by sending Timing Measurement Action Frames to enable receiving the location of the mobile device, derived from flight times of respective signals over a plurality of the signal paths for a plurality of access point devices connected in a common network.

In accordance with another example embodiment of the invention, Location Determination may be performed by a mobile device by requesting the access point to initiate Timing Measurement Procedures, by sending Timing Measurement Request Frames to access points to enable calculating the location of the mobile device, derived from flight times of respective signals over a plurality of the signal paths for a plurality of access point devices that are not connected in a common network.

Figure 1A:
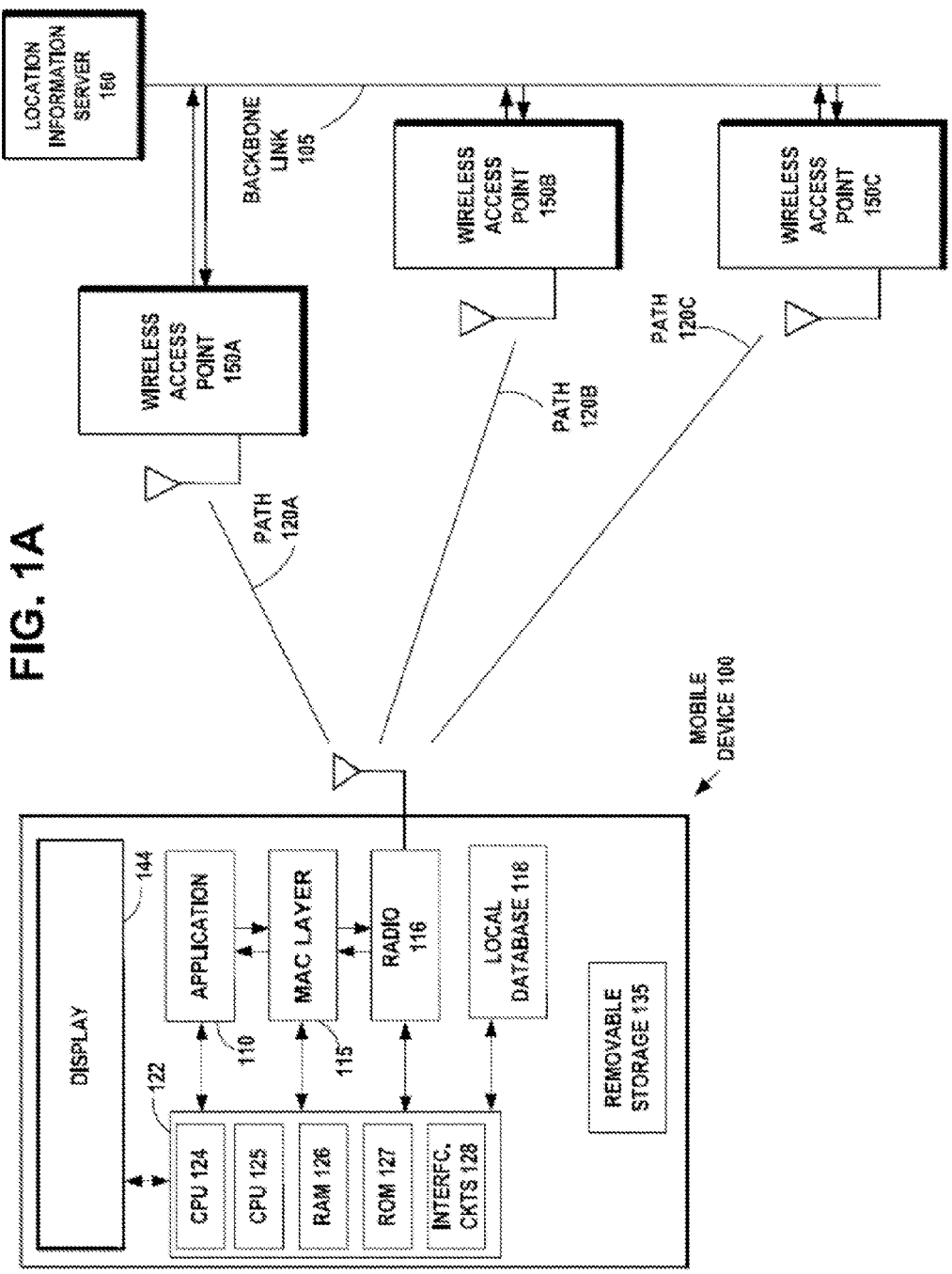
FIG. 1A illustrates an example embodiment of the invention, depicting an example network and architectural diagram showing a mobile wireless device 100 exchanging one or more WiFi messages over the signal paths 120A, 120B, and 120C with each of a plurality of access point devices 150A, 150B, and 150C.

FIG. 1A illustrates an example embodiment of the invention, depicting an example network and architectural diagram showing a mobile wireless device 100 exchanging one or more WiFi messages over the signal paths 120A, 120B, and 120C with each of a plurality of access point devices 150A, 150B, and 150C. The WiFi messages include information related to a relative position of the mobile device 100 with respect to each of the plurality of access point devices 150A, 150B, and 150C. Each of the plurality of access point devices 150A, 150B, and 150C has an accurately determined location. Each of the plurality of access point devices 150A, 150B, and 150C is connected through the backbone link 105 to the location information server 160.

In accordance with an example embodiment of the invention, the mobile wireless device 100 of FIG. 1A includes processor 122 that may access random access memory RAM 126 and/or read only memory ROM 127 in order to obtain stored program code and data for use during processing. RAM 126 or ROM 127 may generally include removable or imbedded memories that operate in a static or dynamic mode. Further, RAM 126 or ROM 127 may include rewritable memories such as Flash, EPROM, etc. Examples of removable storage media based on magnetic, electronic and/or optical technologies such as magnetic disks, optical disks, semiconductor memory circuit devices, and micro-SD memory cards are shown at 135 and in FIG. 5, and may serve, for instance, as a program code and data input/output means. Code may include any interpreted or compiled computer language including computer-executable instructions. The code and/or data may be used to create software modules such as operating systems, communication utilities, user interfaces, more specialized program modules, etc.

The IEEE 802.11 standard specifies methods and techniques of an exemplary wireless local area network (WLAN) operation. Examples include the IEEE 802.11b and 802.11g wireless local area network specifications, which have been a staple technology for traditional WLAN applications in the 2.4 GHz ISM band. The various amendments to the IEEE 802.11 standard were consolidated for IEEE 802.11a, b, d, e, g, h, i, j, k, n, r, s, u, v, and z protocols, into the base standard IEEE 802.11-2012, Wireless Medium Access Control (MAC) and Physical Layer (PHY) Specifications, February 2012 (incorporated herein by reference). Applications of these IEEE 802.11 standards include products such as consumer electronics, telephones, personal computers, and access points for both for home and office.

Network setup for IEEE 801.11 WLANs has been simplified by the Wi-Fi Protected Setup™ system that is included in most access points. The Wi-Fi Alliance published the Wi-Fi Protected Setup (WPS) specification 1.0, Wi-Fi Protected Setup Specification, Version 1.0h, December 2006 (incorporated herein by reference). The Wi-Fi Simple Configuration (WSC) Specification, Version 2.0, Dec. 20, 2010, (incorporated herein by reference), updates the Wi-Fi Protected Setup Specification, Version 1.0h. The acronym WSC, for Wi-Fi Simple Configuration Specification, may be used interchangeably with the acronym WPS, for Wi-Fi Protected Setup. Wi-Fi Protected Setup facilitates the initial setting up of IEEE 802.11 devices in a Wi-Fi infrastructure network so that they may be more easily configured with security features and so that that new Wi-Fi devices may be added to the network. Wi-Fi Protected Setup defines new IEEE 802.11 information elements (IE) that are included in beacons, probe requests and probe responses. The purpose of these IEs is to advertise the presence of devices that are capable of performing Wi-Fi Protected Setup operations.

The Wi-Fi Alliance has developed a Wi-Fi Peer-to-Peer technology named Wi-Fi Direct™ that is specified in the Wi-Fi Alliance Peer-to-Peer Specification, October 2010 (incorporated herein by reference). Wi-Fi Direct, is also referred to herein as Peer-to-Peer or P2P. Wi-Fi Direct enables IEEE 802.11a, g, or n devices to connect to one another, peer-to-peer, without prior setup or the need for wireless access points. Wi-Fi Direct embeds a software access point into any device, which provides a version of Wi-Fi Protected Setup. When a device enters the range of a STA supporting Wi-Fi Direct (a Wi-Fi Direct device), it can connect to it and then gather setup information using a Wi-Fi Protected Setup transfer. Devices that support Wi-Fi Direct may discover one another and advertise available services. Wi-Fi Direct devices support typical Wi-Fi ranges and the same data rates as can be achieved with an 802.11a, g, or n infrastructure connection. When a device enters the range of the Wi-Fi Direct device, it may connect to it using the existing protocol, and then gather setup information using a Wi-Fi Protected Setup 2.0 transfer.

In accordance with an example embodiment of the invention, wireless local area networks (WLANs) are an example environment that may be used in the example embodiments of the invention. However, example embodiments of the invention are applicable to other environments as well, for example cellular systems such as Global System for Mobile Communications (GSM), Wideband Code Division Multiple Access (W-CDMA), High Speed Packet Access (HSPA), Long Term Evolution (LTE), LTE Advanced (LTE-A), International Mobile Telecommunications Advanced (IMT-A), CDMA, Wireless Metropolitan Area Networks (WMAN) and Broadband Fixed Access (BWA) (LMDS, WiMAX, AIDAAS and HiperMAN), or the like networks, as well as short range networks such as Bluetooth, Zigbee, IEEE 802.11, Digital Enhanced Cordless Telecommunications (DECT), HiperLAN, Radio Frequency Identification (RFID), Wireless USB, DSRC (Dedicated Short Range Communications), Near Field Communication, wireless sensor networks, EnOcean; TransferJet, Ultra-wideband (UWB from WiMedia Alliance), WLAN, WiFi, and Hiper-LAN. WLAN discovery mechanisms include passive and active scanning. A device or station that uses the discovery mechanisms is said to be in discovery state. In the passive scanning mode, a device or station in the discovery state listens to a channel for no longer than an interval determined for the scan. In practice, the passively scanning device looks for beacon frames from any wireless networks or representatives of wireless networks or alternatively beacon frames that meet a given criterion, such as a device address or network ID. When a device in the discovery state uses the active scanning, it generates probe request frames and transmits them to request access points to reply with probe response frames, as discovery responses, providing requested information.

In accordance with an example embodiment of the invention, the mobile wireless device 100 may be, for example, a miniature device such as a key fob, smart card, jewelry, or the like. The mobile wireless device 100 may be, for example, a larger device such as a cell phone, smart phone, flip-phone, PDA, graphic pad, or even larger devices such as a laptop computer, an automobile dashboard, and the like.

Figure 1B:
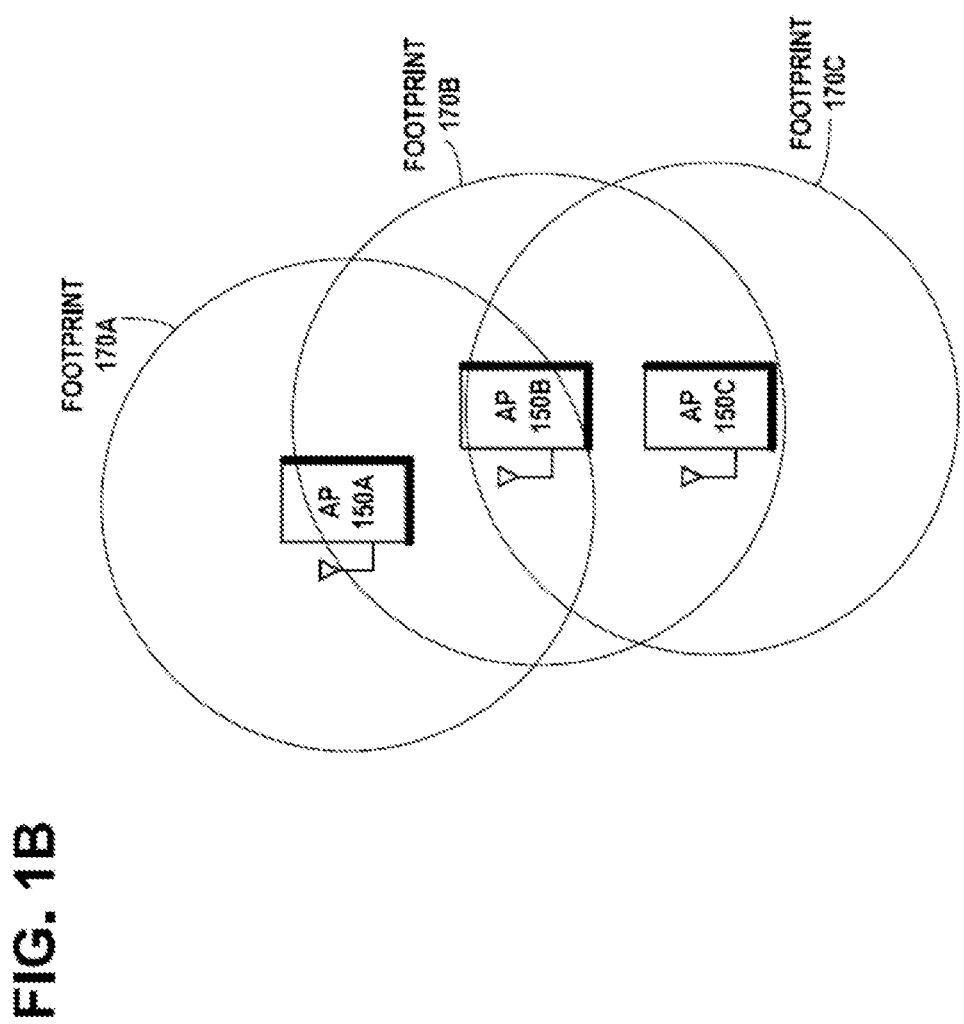
FIG. 1B illustrates an example embodiment of the invention, depicting an example coverage footprint 170A, 170B, and 170C for the respective access point devices 150A, 150B, and 150C.

FIG. 1B illustrates an example embodiment of the invention, depicting an example coverage footprint 170A, 170B, and 170C for the respective access point devices 150A, 150B, and 150C.

A. Location Determination Using WiFi RSSI and/or RCPI

In one embodiment, the mobile device 100 may receive a beacon measurement request from each of the plurality of access point devices 150A, 150B, and 150C, asking the mobile device to perform a scan and report back to the respective access point device the beacon measurement. The mobile device 100 may perform a beacon measurement for each of the plurality of access point devices 150A, 150B, and 150C, which includes at least one of a received signal strength indication (RSSI) and a received channel power indication (RCPI) of a measured beacon from each of the plurality of access point devices. Then the mobile device 100 may transmit to each of the plurality of access point devices 150A, 150B, and 150C, one or more WiFi messages over the signal paths 120A, 120B, and 120C, including the measured at least one of RSSI and RCPI of the measured beacon from each of the plurality of access point devices 150A, 150B, and 150C. In response, the mobile device may receive from at least one of the plurality of access point devices, location information of the mobile device derived from the measured at least one of RSSI and RCPI of the measured beacon from each of the plurality of access point devices, for all of the plurality of access point devices 150A, 150B, and 150C responding to the one or more WiFi messages.

Received Signal Strength Indicator (RSSI) is a measure of RF energy in dBm, which is ten times the logarithm of the ratio of the power (P) at the receiving end and the reference power (Pref). Power at the receiving end is inversely proportional to the square of distance. For example, the RSSI may be referenced to a Pref of 1 mW (dBm). Hence RSSI may be used as an indicator of the distance at which the sending node is located from the receiving node. When data from many such neighboring nodes are combined, the location of the sending node may be judged with reasonable accuracy. A received channel power indicator (RCPI) value is used as a measure of the received RF power in the selected channel, measured at the antenna connector. The RCPI may be used as an indicator of the distance at which the sending node is located from the receiving node.

FIG. 2A illustrates the flow diagram 200 of an example embodiment of the invention for Location Determination Using WiFi Received Signal Strength Indicator (RSSI) and/or received channel power indicator (RCPI). The following sequence of steps is performed by both a mobile device (MD) and an access point (AP).

Step 202: Mobile device connects to an access point, if it is not already connected.

Step 204: Mobile device Asks the access point: 'Where am I?'

Step 206: Access point responds with a 'Come back later' response, specifying a time in seconds (the comeback delay) for the mobile device to re-issue the request. It may also include a dialog token in this response, which would be replicated back by the mobile device in its subsequent request.

Step 208: Access point sends the mobile device a beacon measurement request, asking the mobile device to perform a scan and report back to the access point the beacon measurement. Measurement duration to be set at less than the comeback delay.

Step 210: Mobile device responds with a beacon measurement, which includes the RSSI and RCPI of the seen beacons from other access points.

Step 212: Access point, or a server behind the access point, will then estimate the location of the mobile device, knowing the precise location of all access points reported in the beacon report received from the mobile device and knowing the approximate footprint of the access points reported.

Step 214: Mobile device resends the request of 'Where am I?' after the comeback delay expires.

Step 216: Access point responds with the determined location of the mobile device.

Figure 2B:
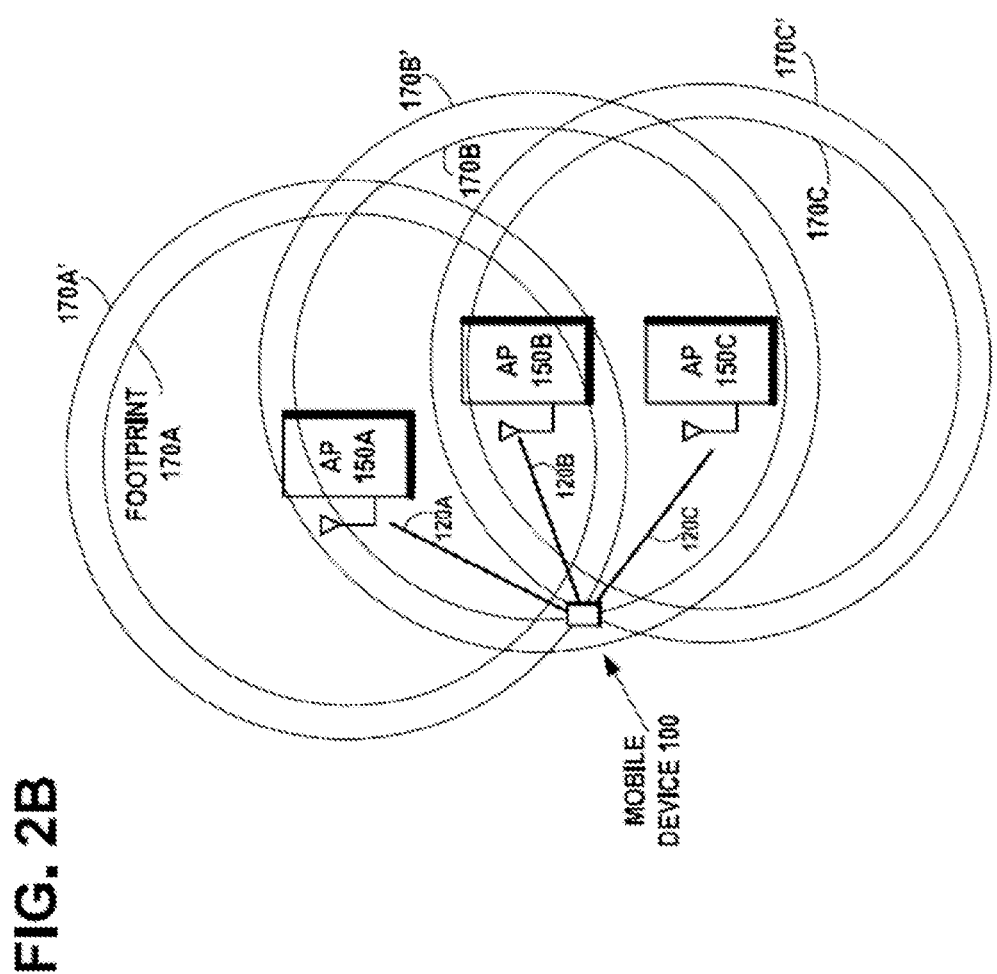
FIG. 2B illustrates an example embodiment of the invention, depicting an example coverage footprint 170A, 170B, and 170C for the respective access point devices 150A, 150B, and 150C.

FIG. 2B illustrates an example embodiment of the invention, depicting an example coverage footprint 170A, 170B, and 170C for the respective access point devices 150A, 150B, and 150C. The beacon measurements made by the mobile device, in response to the beacon measurement request from access point A, includes at least one of the RSSI and RCPI of the seen beacons over the signal paths 120A, 120B, and 120C for the respective access points 150A, 150B, and 150C. The RSSI at the receiving mobile device is inversely proportional to the square of distance from the respective access point, and is an indicator of the distance at which the mobile device is located from the access point. The RCPI may also be used as an indicator of the distance at which the mobile device is located from the access point. The tolerance in the measurement of the distance from the respective access point is indicated by the concentric footprints shown in the figure. For example, the measured distance of the mobile device from the access point 150A is indicated to be in the annular area of overlap of the footprint 170A' and the footprint 170A. The measured distance of the mobile device from the access point 150B is indicated to be in the annular area of overlap of the footprint 170B' and the footprint 170B. The measured distance of the mobile device from the access point 150C is indicated to be in the annular area of overlap of the footprint 170C' and the footprint 170C. The measured values of RSSI and RCPI are included in the beacon measurement made by the mobile device, in response to the beacon measurement request from access point A. access point 150A, or the location information server 160 coupled to the access point 150A, will then estimate the location of the mobile device, knowing the precise location of all access points 150A, 150B, and 150C reported in the beacon report received by access point 150A from the mobile device and knowing the approximate footprints 170A, 170B, and 170C of the access points 150A, 150B, and 150C reported.

The distances from AP 150A to the circles 170A (R) and 170A' (R') are the result of errors in the Beacon RSSI/RCPI measurements or Flight time measurements. That is, the flight time measurement may indicate that the distance between the mobile device and the access point is Re (which=(R+R')/2, to be calculated), with an error resulting in a distance of De (which is in fact the R'−R). The error may be the result of inaccurate time stamping of the M messages during the timing measurement procedure. Thus, R' may be calculated as R'=Re+error/2, and R=Re−error/2, which is the tolerance in the measurement of the distance.

FIG. 2C illustrates an example embodiment of the invention, depicting an example flow diagram 220 of an example method of Location Determination Using WiFi RSSI and/or RCPI, from the point of view of the mobile wireless device 100, in accordance with at least one embodiment of the present invention. The steps of the flow diagram represent computer code instructions stored in the RAM and/or ROM memory of the device, which when executed by the central processing units (CPU) 124 and/or 125, carry out the functions of the example embodiments of the invention. The steps may be carried out in another order than shown and individual steps may be combined or separated into component steps. The flow diagram has the following steps:

Step 222: while a connection exists between a mobile device and an access point;

Step 224: transmitting, by the mobile device, a request to the access point, to identify the location of the mobile device;

Step 226: receiving, by the mobile device, a message requesting the mobile device to repeat the request after a comeback delay that is specified in the response message;

Step 228: receiving, by the mobile device, a beacon measurement request from the access point, requesting the mobile device to perform a scan and report back to the access point a beacon measurement, the measurement request indicating a measurement time shorter than the comeback delay;

Step 230: monitoring, by the mobile device, beacons received from the access point and beacons received from other access points within range, and measuring received signal strength indication (RSSI) and received channel power indication (RCPI) of the beacons received from the access point and the beacons received from other access points within range;

Step 232: transmitting, by the mobile device, a beacon measurement report message to the access point, including the measurements of received signal strength indication (RSSI) and/or received channel power indication (RCPI) of the beacons received from the access point and the beacons received from other access points within range;

Step 234: transmitting, by the mobile device, a subsequent request to the access point, to identify the location of the mobile device, the subsequent request being sent after the comeback delay that was specified in the response message from the access point;

Step 236: receiving, by the mobile device, a location estimation message from the access point, including an estimation of the location of the mobile device, based on known locations of the access point and the other access points reported in the beacon measurement message and based on known approximate footprints of the access point and the other access points reported in the beacon measurement message.

FIG. 2D illustrates an example embodiment of the invention, depicting an example flow diagram 240 of an example method of Location Determination Using WiFi RSSI and/or RCPI, from the point of view of the access point device 150A, in accordance with at least one embodiment of the present invention. The steps of the flow diagram represent computer code instructions stored in the RAM and/or ROM memory of the device, which when executed by the central processing units (CPU) of the device, carry out the functions of the example embodiments of the invention. The steps may be carried out in another order than shown and individual steps may be combined or separated into component steps. The flow diagram has the following steps:

Step 242: while a connection exists between a mobile device and an Access point;

Step 244: receiving, by the access point, a request from the mobile device, to identify the location of the mobile device;

Step 246: transmitting, by the access point, a response message requesting the mobile device to repeat the request after a comeback delay that is specified in the response message;

Step 248: transmitting, by the access point, a beacon measurement request to the mobile device, requesting the mobile device to perform a scan and report back to the access point a beacon measurement, the measurement request indicating a measurement time shorter than the comeback delay;

Step 250: receiving, by the access point, a beacon measurement report message from the mobile device, including the measurements of received signal strength indication (RSSI) and/or received channel power indication (RCPI) of beacons received from the access point and beacons received from other access points within range of the mobile device;

Step 252: receiving, by the access point, a subsequent request from the mobile device, to identify the location of the mobile device, the subsequent request being sent after the comeback delay that was specified in the response message from the access point; and Step 254: transmitting, by the access point, a location estimation message to the mobile device, including an estimation of the location of the mobile device, based on known locations of the access point and the other access points reported in the beacon measurement message and based on known approximate footprints of the access point and the other access points reported in the beacon measurement message.

B. Location Determination Using WiFi Timing Measurement Action Frame

In accordance with another example embodiment of the invention, a mobile device may transmit to each of the plurality of access point devices 150A, 150B, and 150C, over signal paths 120A, 120B, and 120C, a timing measurement action frame. In response, the mobile device may receive from at least one of the plurality of access point devices 150A, 150B, and 150C, location information of the mobile device derived from flight times of respective signals over the signal paths 120A, 120B, and 120C, for all of the plurality of access point devices 150A, 150B, and 150C.

FIG. 3A illustrates the flow diagram 300 of an example embodiment of the invention for Location Determination Using WiFi Timing Measurement Action Frame. The following sequence of steps is performed by both a mobile device (MD) 100 and two or more access points (AP) 150A and 150B.

Step 304: Mobile device transmits a Timing measurement action frame (not a timing Measurement Request action frame) to a first access point. At the end of this action frame exchange, the first access point will learn the flight time of the signal between itself and the mobile device.

Step 306: First access point learns flight time of signal between itself and mobile device and sends the flight time to the location information server.

Step 308: Mobile device transmits a Timing measurement action frame (not a timing Measurement Request action frame) to a second access point. At the end of this action frame exchange, the second access point will learn the flight time of the signal between itself and the mobile device.

Step 310: Second access point learns flight time of signal between itself and mobile device and sends the flight time to the location information server.

Step 312: Mobile device transmits a Timing measurement action frame (not a timing Measurement Request action frame) to a N-th access point. At the end of this action frame exchange, the N-th access point will learn the flight time of the signal between itself and the mobile device.

Step 314: The N-th access point learns flight time of signal between itself and mobile device and sends the flight time to the location information server.

Step 316: location information server determines location of the mobile device, based on list of access points visible from the mobile device, the flight time of the radio signal from those access points to the mobile device, and the exact location of the access points.

Step 318: At the end, the mobile device will simply ask the question from the access point it is currently associated with: 'Where am I?' At this point, since the mobile device initiated timing measurement procedure with multiple access points, the infrastructure Location Information Server connected to it, is able to determine precisely the location of the mobile device, based on a list of access points which are visible from the mobile device, the flight time of the radio signal from those access points to the mobile device, and the exact location of the access points.

Step 320: Access point responds with the determined exact location of the mobile device.

Note: this procedure is useful when the mobile device performs a scan and sees multiple access points belonging to the same extended service set (ESS).

In an example embodiment of the invention, associating to the access point is required before initiating a timing measurement request. In another example embodiment of the invention, initiating a timing measurement procedure may not require connecting or associating to the access point.

Figure 3B:
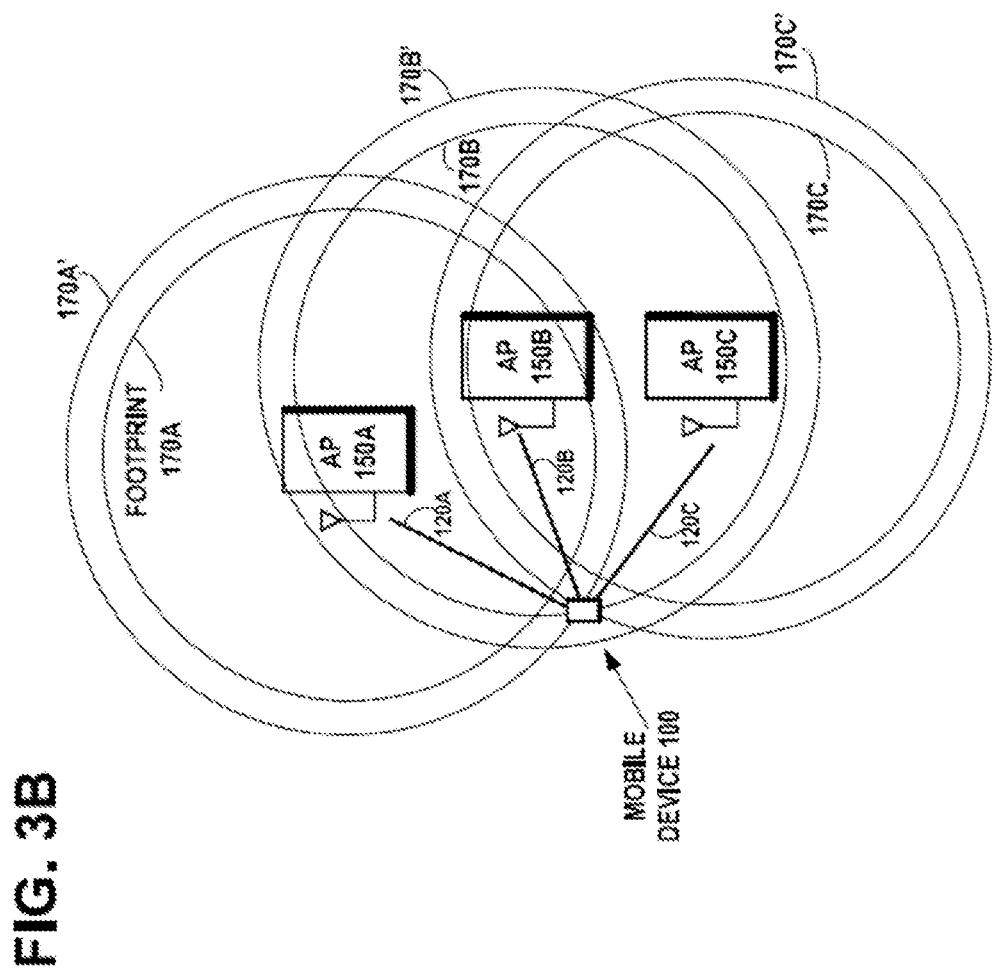
FIG. 3B illustrates an example embodiment of the invention, depicting an example coverage footprint 170A, 170B, and 170C for the respective access point devices 150A, 150B, and 150C.

FIG. 3B illustrates an example embodiment of the invention, depicting an example coverage footprint 170A, 170B, and 170C for the respective access point devices 150A, 150B, and 150C. The time of flight measurements over the signal paths 120A, 120B, and 120C, are made by the respective access points 150A, 150B, and 150C. The tolerance in the measurement of the distance from the respective access point is indicated by the concentric footprints shown in the figure. For example, the measured distance of the mobile device from the access point 150A is indicated to be in the annular area of overlap of the footprint 170A' and the footprint 170A. The measured distance of the mobile device from the access point 150B is indicated to be in the annular area of overlap of the footprint 170B' and the footprint 170B. The measured distance of the mobile device from the access point 150C is indicated to be in the annular area of overlap of the footprint 170C' and the footprint 170C. The location information server 160 coupled to the access points 150A, 150B, and 150C, will then estimate the location of the mobile device, knowing the precise location of all access points 150A, 150B, and 150C and knowing the approximate footprints 170A, 170B, and 170C of the access points 150A, 150B, and 150C reported.

The distances from AP 150A to the circles 170A (R) and 170A' (R') are the result of errors in the Beacon RSSI/RCPI measurements or Flight time measurements. That is, the flight time measurement may indicate that the distance between the mobile device and the access point is Re (which=(R+R')/2, that will be calculated), with an error resulting in a distance of De (which is in fact the R'−R). The error may be the result of inaccurate time stamping of the M messages during the timing measurement procedure. Thus, R' may be calculated as R'=Re+error/2, and R=Re−error/2, which is the tolerance in the measurement of the distance.

Figure 3C:
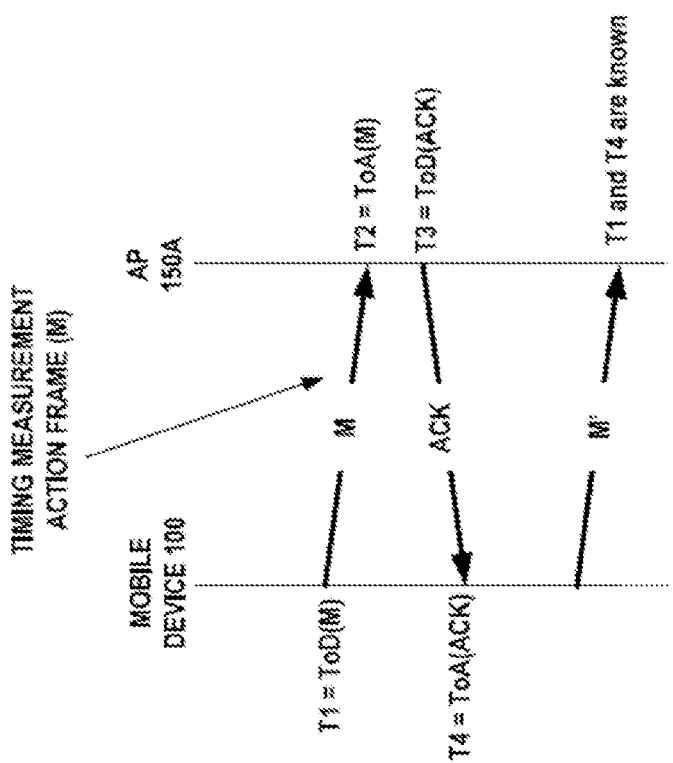
FIG. 3C illustrates an example embodiment of the invention, depicting an example timing measurement procedure for the Location Determination Using WiFi Timing Measurement Action Frame.

FIG. 3C illustrates an example embodiment of the invention, depicting an example timing measurement procedure for the Location Determination Using WiFi Timing Measurement Action Frame. The mobile device 100 that supports the timing measurement procedure may transmit a Timing Measurement Action Frame to the access point 150A that also supports the timing measurement procedure. A mobile device 100 transmits Timing Measurement frames in overlapping pairs. The first Timing Measurement frame of a pair contains a nonzero Dialog Token. The follow up Timing Measurement frame contains a Follow Up Dialog Token set the value of the Dialog Token in the first frame of the pair. With the first Timing Measurement frame, both the mobile device 100 and the access point 150A capture timestamps. The mobile device 100 captures the time at which the Timing Measurement frame is transmitted (t1). The receiving access point 150A captures the time at which the Timing Measurement frame arrives (t2) and the time at which the ACK response is transmitted (t3). The mobile device 100 captures the time at which the ACK arrives (t4). In the follow up Timing Measurement frame, the mobile device 100 transfers the timestamp values it captured (t1 and t4) to the access point 150A. The access point 150A may now measure the time of flight of signals from the mobile device 100.

FIG. 3D illustrates an example embodiment of the invention, depicting an example flow diagram 340 of an example method of Location Determination Using WiFi Timing Measurement Action Frame, from the point of view of the mobile wireless device 100, in accordance with at least one embodiment of the present invention. The steps of the flow diagram represent computer code instructions stored in the RAM and/or ROM memory of the device, which when executed by the central processing units (CPU) 124 and/or 125, carry out the functions of the example embodiments of the invention. The steps may be carried out in another order than shown and individual steps may be combined or separated into component steps. The flow diagram has the following steps:

Step 342: transmitting, by a mobile device, to a first access point a Timing measurement action frame to the first access point, to enable the first access point to measure a first flight time of a signal between the first access point and the mobile device, for storage of the first measured flight time in a server;

Step 344: transmitting, by the a mobile device, to a second access point a Timing measurement action frame to a second access point, to enable the second access point to measure a second flight time of a signal between the second access point and the mobile device, for storage of the second measured flight time in the server;

Step 346: transmitting, by the mobile device, a request to a currently connected access point coupled to the server, to identify the location of the mobile device; and Step 348: receiving, by the mobile device, from the currently connected access point, a determined location of the mobile device, based on at least the first and second flight times of signals from at least the first and second access points, respectively, to the mobile device, and the locations of at least the first and second the access points. In an example embodiment of the invention, associating to the access point is required before initiating a timing measurement request. In another example embodiment of the invention, initiating a timing measurement procedure may not require connecting or associating to the access point.

FIG. 3E illustrates an example embodiment of the invention, depicting an example flow diagram 360 of an example method of Location Determination Using WiFi Timing Measurement Action Frame, from the point of view of the access point device 150A, in accordance with at least one embodiment of the present invention. The steps of the flow diagram represent computer code instructions stored in the RAM and/or ROM memory of the device, which when executed by the central processing units (CPU) of the device, carry out the functions of the example embodiments of the invention. The steps may be carried out in another order than shown and individual steps may be combined or separated into component steps. The flow diagram has the following steps:

Step 362: receiving, by a first access point, a Timing measurement action frame from a mobile device;

Step 364: measuring, by the first access point, a first flight time of a signal between the first access point and the mobile device, in response to the Timing measurement action frame;

Step 366: storing, by the first access point, the measured first flight time in a server coupled to the first access point;

Step 368: receiving, by the first access point, a request from the mobile device to identify the location of the mobile device; and Step 370: transmitting, by the first access point, a determined location of the mobile device, based the measured first flight time of signals between the mobile device and the first access point and measured flight times of signals between the mobile device and other access points coupled to the server, and the locations of the first and other the access points, the other access points having received a Timing measurement action frame from the mobile device.

C. Location Determination Using WiFi Timing Measurement Request Frame

In accordance with another example embodiment of the invention, a mobile device may sequentially transmit to each of the plurality of access point devices 150A, 150B, and 150C, over respective signal paths 120A, 120B, and 120C, a WiFi Timing Measurement Request Frame. In response, the access points initiate a Timing Measurement procedure, which enables the mobile device to calculate the flight time of the signal between itself and the corresponding access points a first flight time for signals over the first signal path 120A, for the first access point device 150A. The mobile device may receive from the second access point 150A, a second flight time for signals over the second signal path 120B, for the second access point device 150B. The mobile device may receive from the third access point 150C, a third flight time for signals over the third signal path 120C, for the third access point device 150C. The mobile device may then transmit the list of the access points 150A, 150B, and 150C, and the respective measured flight times to an external Location Information Server that will then determine the location of the mobile device. The mobile device may then transmit a request to a currently connected access point, for example access point 150A that is coupled to the server, to identify the location of the mobile device. The currently connected access point 150A will transmit back to the mobile device, the determined location of the mobile device, based on at least the first and second flight times of signals from at least the first and second access points 150A and 150B, respectively, to the mobile device, and the locations of at least the first and second the access points 150A and 150B.

FIG. 4A illustrates the flow diagram 400 of an example embodiment of the invention for Location Determination Using WiFi Timing Measurement Request Frame. The following sequence of steps is performed by both a mobile device (MD) 100 and two or more access points (AP) 150A and 150B.

Step 404: Mobile device transmits a Timing measurement request action frame (not a timing Measurement action frame) to a first access point. The timing measurement request action frame causes the access point to initiate a timing measurement procedure with the mobile device. At the end of this action frame exchange or procedure, the mobile device will learn the flight time of the signal between first access point and the mobile device.

Step 406: Mobile device transmits a Timing measurement request action frame (not a timing Measurement action frame) to a second access point. The timing measurement request action frame causes the access point to initiate a timing measurement procedure with the mobile device. At the end of this action frame exchange or procedure, the mobile device will learn the flight time of the signal between first access point and the mobile device.

Step 408: Mobile device transmits a Timing measurement request action frame (not a timing Measurement action frame) to a N-th access point. The timing measurement request action frame causes the access point to initiate a timing measurement procedure with the mobile device. At the end of this action frame exchange or procedure, the mobile device will learn the flight time of the signal between first access point and the mobile device.

Step 410: Mobile device transmits a list of the access points and the respective measured flight times to an external Location Information Server that will then determine the location of the mobile device.

Step 412: Mobile device transmits a request to a currently connected access point that is coupled to a server, to identify the location of the mobile device.

Step 414: The currently connected access point transmits back to the mobile device, the determined location of the mobile device, based on at least the first and second flight times of signals from at least the first and second access points, respectively, to the mobile device, and the locations of at least the first and second the access points.

Note: this procedure is useful when the mobile device performs a scan but does not see multiple BSSIDs belonging to the same ESS.

In an example embodiment of the invention, just before or just after step 404, the mobile device may ask the first access point its location. There are two methods defined in the standard on how to ask GPS location: [a] the so called LCI request, and [b] the ANQP Geo Location. There are two similar methods to ask civic/postal location. Similarly, just before or just after step 406, the mobile device asks the second access point's location, and similarly for the N-th access point's location. Then, instead of steps 410-414, the mobile device simply calculates its location using the location of the access points and the annular areas determined from the flight time measurements, with the resulting location of the mobile device being the intersection of the annular areas. An example of this embodiment is illustrated in FIG. 4E.

Figure 4B:
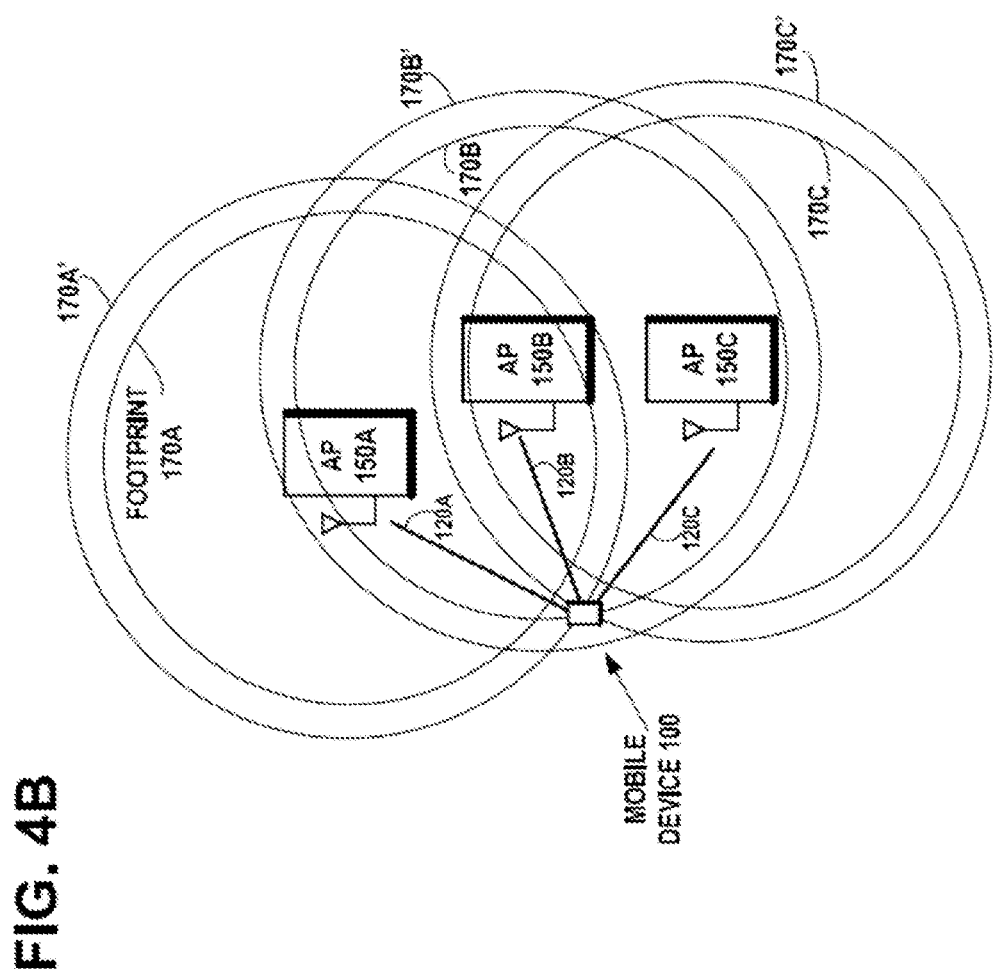
FIG. 4B illustrates an example embodiment of the invention, depicting an example coverage footprint 170A, 170B, and 170C for the respective access point devices 150A, 150B, and 150C.

FIG. 4B illustrates an example embodiment of the invention, depicting an example coverage footprint 170A, 170B, and 170C for the respective access point devices 150A, 150B, and 150C. The time of flight measurements over the signal paths 120A, 120B, and 120C, are made by the respective access points 150A, 150B, and 150C. The tolerance in the measurement of the distance from the respective access point is indicated by the concentric footprints shown in the figure. For example, the measured distance of the mobile device from the access point 150A is indicated to be in the annular area of overlap of the footprint 170A' and the footprint 170A. The measured distance of the mobile device from the access point 150B is indicated to be in the annular area of overlap of the footprint 170B' and the footprint 170B. The measured distance of the mobile device from the access point 150C is indicated to be in the annular area of overlap of the footprint 170C' and the footprint 170C. The mobile device may then transmit the list of the access points 150A, 150B, and 150C, and the respective measured flight times to an external Location Information Server that will then determine the location of the mobile device. The mobile device may then transmit a request to a currently connected access point, for example access point 150A that is coupled to the server, to identify the location of the mobile device. The currently connected access point 150A will transmit back to the mobile device, the determined location of the mobile device, based on at least the first and second flight times of signals from at least the first and second access points 150A and 150B, respectively, to the mobile device, and the locations of at least the first and second the access points 150A and 150B.

The distances from AP 150A to the circles 170A (R) and 170A' (R') are the result of errors in the Beacon RSSI/RCPI measurements or Flight time measurements. That is, the flight time measurement may indicate that the distance between the mobile device and the access point is Re (which=(R+R')/2, that will be calculated), with an error resulting in a distance of De (which is in fact the R'−R). The error may be the result of inaccurate time stamping of the M messages during the timing measurement procedure. Thus, R' may be calculated as R'=Re+error/2, and R=Re−error/2, which is the tolerance in the measurement of the distance.

Figure 4C:
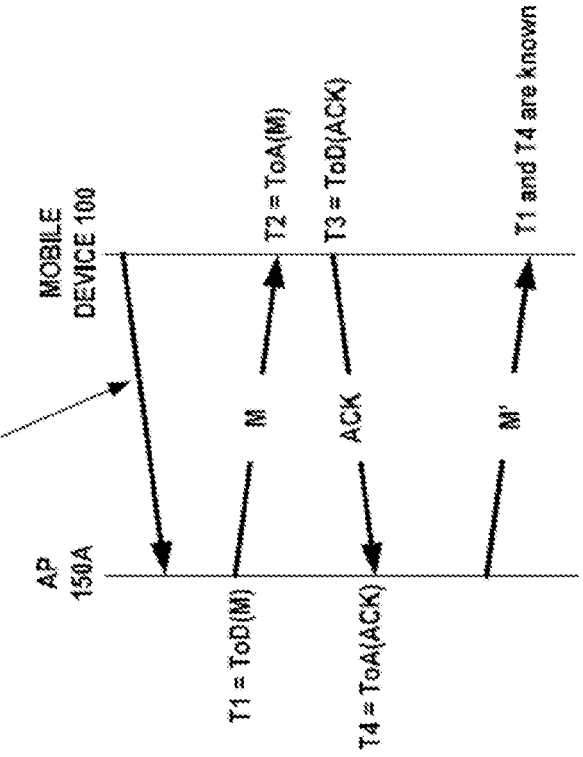
FIG. 4C illustrates an example embodiment of the invention, depicting an example timing measurement procedure for the Location Determination Using WiFi Timing Measurement Request Frame.

FIG. 4C illustrates an example embodiment of the invention, depicting an example timing measurement procedure for the Location Determination Using WiFi Timing Measurement Request Frame. The mobile device 100 that supports the timing measurement procedure may transmit a WiFi Timing Measurement Request Frame to the access point 150A that also supports the timing measurement procedure. In response to the request, the access point 150A transmits Timing Measurement frames in overlapping pairs. The first Timing Measurement frame of a pair contains a nonzero Dialog Token. The follow up Timing Measurement frame contains a Follow Up Dialog Token set the value of the Dialog Token in the first frame of the pair. With the first Timing Measurement frame, both the mobile device 100 and the access point 150A capture timestamps. The access point 150A captures the time at which the Timing Measurement frame is transmitted (t1). The receiving mobile device 100 captures the time at which the Timing Measurement frame arrives (t2) and the time at which the ACK response is transmitted (t3). The access point 150A captures the time at which the ACK arrives (t4). In the follow up Timing Measurement frame, the access point 150A transfers the timestamp values it captured (t1 and t4) to the mobile device 100. The mobile device 100 may now measure the time of flight of signals from the access point 150A.

FIG. 4D illustrates an example embodiment of the invention, depicting an example flow diagram 440 of an example method of Location Determination Using WiFi Timing Measurement Request Frame, from the point of view of the mobile wireless device 100, in accordance with at least one embodiment of the present invention. The steps of the flow diagram represent computer code instructions stored in the RAM and/or ROM memory of the device, which when executed by the central processing units (CPU) 124 and/or 125, carry out the functions of the example embodiments of the invention. The steps may be carried out in another order than shown and individual steps may be combined or separated into component steps. The flow diagram has the following steps:

Step 442: transmitting, by a mobile device, to a first access point a timing measurement request frame, to enable the mobile device to measure a first flight time of a signal between the first access point and the mobile device;

Step 444: transmitting, by the mobile device, to a second access point a timing measurement request frame, to enable the mobile device to measure a second flight time of a signal between the second access point and the mobile device;

Step 446: transmitting, by the mobile device, a list of at least the first and second access points and the respective first and second measured flight times, to a location information server that will then determine the location of the mobile device;

Step 448: transmitting, by the mobile device, a request to a currently connected access point that is coupled to the location information server, to identify the location of the mobile device; and Step 450: receiving, by the mobile device, from the currently connected access point, the determined location of the mobile device, based on at least the first and second flight times of signals from at least the first and second access points, respectively, to the mobile device, and locations of at least the first and second the access points.

In an example embodiment of the invention, associating to the access point is required before initiating a timing measurement request. In another example embodiment of the invention, initiating a timing measurement procedure may not require connecting or associating to the access point.

FIG. 4E illustrates an example embodiment of the invention, depicting an example flow diagram 460 of an example method of Location Determination Using WiFi Timing Measurement Request Frame, from the point of view of the mobile wireless device 100, wherein the mobile device calculates its location using the location of the access points and the annular areas determined from the flight time measurements, wherein the resulting location of the mobile device is the intersection of the annular areas, in accordance with at least one embodiment of the present invention.

Step 462: transmitting, by a mobile device, to a first access point a timing measurement request frame, to enable the mobile device to measure a first flight time of a signal between the first access point and the mobile device;

Step 464: requesting by the mobile device a location of the first access point;

Step 466: transmitting, by the mobile device, to a second access point a timing measurement request frame, to enable the mobile device to measure a second flight time of a signal between the second access point and the mobile device;

Step 468: requesting by the mobile device a location of the second access point;

Step 470: transmitting, by the mobile device, to an Nth access point a timing measurement request frame, to enable the mobile device to measure a second flight time of a signal between the Nth access point and the mobile device;

Step 472: requesting by the mobile device a location of the Nth access point;

Step 474: determining, by the mobile device, its own location, based on at least the first and second flight times of signals from at least the first and second access points, respectively, and locations of at least the first and second the access points, the location being an intersection of resulting annular areas.

Figure 5:
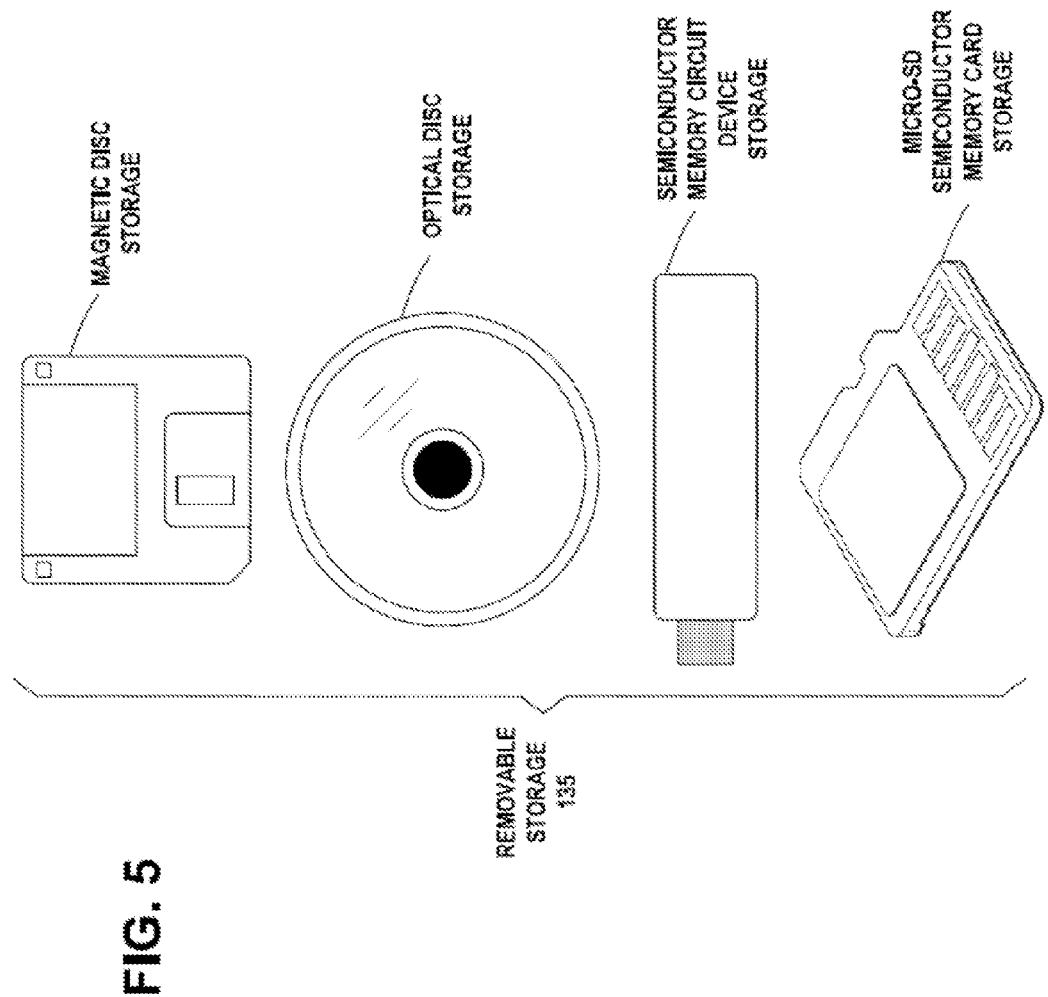
FIG. 5 illustrates an example embodiment of the invention, wherein examples of removable storage media 135 are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

FIG. 5 illustrates an example embodiment of the invention, wherein examples of removable storage media 135 are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

An example embodiment of the invention is shown in FIG. 2C Mobile Device—Location Determination Using WiFi RSSI and/or RCPI:

A method, comprising:

transmitting, by the mobile device, a request to the access point, to identify the location of the mobile device;

receiving, by the mobile device, a message requesting the mobile device to repeat the request after a comeback delay that is specified in the response message;

receiving, by the mobile device, a beacon measurement request from the access point, requesting the mobile device to perform a scan and report back to the access point a beacon measurement, the measurement request indicating a measurement time shorter than the comeback delay;

monitoring, by the mobile device, beacons received from the access point and beacons received from other access points within range, and measuring received signal strength indication (RSSI) and received channel power indication (RCPI) of the beacons received from the access point and the beacons received from other access points within range;

transmitting, by the mobile device, a beacon measurement report message to the access point, including the measurements of received signal strength indication (RSSI) and/or received channel power indication (RCPI) of the beacons received from the access point and the beacons received from other access points within range;

transmitting, by the mobile device, a subsequent request to the access point, to identify the location of the mobile device, the subsequent request being sent after the comeback delay that was specified in the response message from the access point;

receiving, by the mobile device, a location estimation message from the access point, including an estimation of the location of the mobile device, based on known locations of the access point and the other access points reported in the beacon measurement message and based on known approximate footprints of the access point and the other access points reported in the beacon measurement message.

An example embodiment of the invention is shown in FIG. 2D Access point—Location Determination Using WiFi RSSI and/or RCPI:

A method, comprising:

while a connection exists between a mobile device and an access point;

receiving, by the access point, a request from the mobile device, to identify the location of the mobile device;

transmitting, by the access point, a response message requesting the mobile device to repeat the request after a comeback delay that is specified in the response message;

transmitting, by the access point, a beacon measurement request to the mobile device, requesting the mobile device to perform a scan and report back to the access point a beacon measurement, the measurement request indicating a measurement time shorter than the comeback delay;

receiving, by the access point, a beacon measurement report message from the mobile device, including the measurements of received signal strength indication (RSSI) and/or received channel power indication (RCPI) of beacons received from the access point and beacons received from other access points within range of the mobile device;

receiving, by the access point, a subsequent request from the mobile device, to identify the location of the mobile device, the subsequent request being sent after the comeback delay that was specified in the response message from the access point; and transmitting, by the access point, a location estimation message to the mobile device, including an estimation of the location of the mobile device, based on known locations of the access point and the other access points reported in the beacon measurement message and based on known approximate footprints of the access point and the other access points reported in the beacon measurement message.

An example embodiment of the invention is shown in FIG. 3D Mobile Device—Location Determination Using WiFi Timing Measurement Action Frame:

A method, comprising:

transmitting, by a mobile device, to a first access point a Timing measurement action frame, to enable the first access point to measure a first flight time of a signal between the first access point and the mobile device, for storage of the first measured flight time in a server;

transmitting, by the a mobile device, to a second access point a Timing measurement action frame, to enable the second access point to measure a second flight time of a signal between the second access point and the mobile device, for storage of the second measured flight time in the server;

transmitting, by the mobile device, a request to a currently connected access point coupled to the server, to identify the location of the mobile device; and receiving, by the mobile device, from the currently connected access point, a determined location of the mobile device, based on at least the first and second flight times of signals from at least the first and second access points, respectively, to the mobile device, and the locations of at least the first and second the access points.

An example embodiment of the invention is shown in FIG. 3E Access point—Location Determination Using WiFi Timing Measurement Action Frame:

A method, comprising:

receiving, by a first access point, a Timing measurement action frame from a mobile device;

measuring, by the first access point, a first flight time of a signal between the first access point and the mobile device, in response to the Timing measurement action frame;

storing, by the first access point, the measured first flight time in a server coupled to the first access point;

receiving, by the first access point, a request from the mobile device to identify the location of the mobile device; and transmitting, by the first access point, a determined location of the mobile device, based on the measured first flight time of signals between the mobile device and the first access point and measured flight times of signals between the mobile device and other access points coupled to the server, and the locations of the first and other the access points, the other access points having received a Timing measurement action frame from the mobile device.

An example embodiment of the invention is shown in FIG. 4D Mobile Device—Location Determination Using WiFi Timing Measurement Request Frame:

A method, comprising:

transmitting, by a mobile device, to a first access point a timing measurement request frame, to enable the mobile device to measure a first flight time of a signal between the first access point and the mobile device;

transmitting, by the mobile device, to a second access point a timing measurement request frame, to enable the mobile device to measure a second flight time of a signal between the second access point and the mobile device;

transmitting, by the mobile device, a list of at least the first and second access points and the respective first and second measured flight times, to a location information server that will then determine the location of the mobile device;

transmitting, by the mobile device, a request to a currently connected access point that is coupled to the location information server, to identify the location of the mobile device; and receiving, by the mobile device, from the currently connected access point, the determined location of the mobile device, based on at least the first and second flight times of signals from at least the first and second access points, respectively, to the mobile device, and locations of at least the first and second the access points.

An example embodiment of the invention is related to FIG. 2C Mobile Device—Location Determination Using WiFi RSSI and/or RCPI:

An apparatus, comprising:

at least one processor;

at least one memory including computer program code;

the at least one memory and the computer program code configured to, with the at least one processor, cause the apparatus at least to:

transmit a request to the access point, to identify the location of the mobile device;

receive a message requesting the mobile device to repeat the request after a comeback delay that is specified in the response message;

receive a beacon measurement request from the access point, requesting the mobile device to perform a scan and report back to the access point a beacon measurement, the measurement request indicating a measurement time shorter than the comeback delay;

monitor beacons received from the access point and beacons received from other access points within range, and measuring received signal strength indication (RSSI) and received channel power indication (RCPI) of the beacons received from the access point and the beacons received from other access points within range;

transmit a beacon measurement report message to the access point, including the measurements of received signal strength indication (RSSI) and/or received channel power indication (RCPI) of the beacons received from the access point and the beacons received from other access points within range;

transmit a subsequent request to the access point, to identify the location of the mobile device, the subsequent request being sent after the comeback delay that was specified in the response message from the access point;

receive a location estimation message from the access point, including an estimation of the location of the mobile device, based on known locations of the access point and the other access points reported in the beacon measurement message and based on known approximate footprints of the access point and the other access points reported in the beacon measurement message.

An example embodiment of the invention is related to FIG. 2D Access point—Location Determination Using WiFi RSSI and/or RCPI:

An apparatus, comprising:

at least one processor;

at least one memory including computer program code;

the at least one memory and the computer program code configured to, with the at least one processor, cause the apparatus at least to:

receive a request from the mobile device, to identify the location of the mobile device;

transmit a response message requesting the mobile device to repeat the request after a comeback delay that is specified in the response message;

transmit a beacon measurement request to the mobile device, requesting the mobile device to perform a scan and report back to the access point a beacon measurement, the measurement request indicating a measurement time shorter than the comeback delay;

receive a beacon measurement report message from the mobile device, including the measurements of received signal strength indication (RSSI) and/or received channel power indication (RCPI) of beacons received from the access point and beacons received from other access points within range of the mobile device;

receive a subsequent request from the mobile device, to identify the location of the mobile device, the subsequent request being sent after the comeback delay that was specified in the response message from the access point; and transmit a location estimation message to the mobile device, including an estimation of the location of the mobile device, based on known locations of the access point and the other access points reported in the beacon measurement message and based on known approximate footprints of the access point and the other access points reported in the beacon measurement message.

An example embodiment of the invention is related to FIG. 3D Mobile Device—Location Determination Using WiFi Timing Measurement Action Frame:

An apparatus, comprising:

at least one processor;

at least one memory including computer program code;

the at least one memory and the computer program code configured to, with the at least one processor, cause the apparatus at least to:

transmit to a first access point a Timing measurement action frame, to enable the first access point to measure a first flight time of a signal between the first access point and the mobile device, for storage of the first measured flight time in a server;

transmit to a second access point a Timing measurement action frame, to enable the second access point to measure a second flight time of a signal between the second access point and the mobile device, for storage of the second measured flight time in the server;

transmit a request to a currently connected access point coupled to the server, to identify the location of the mobile device; and receive from the currently connected access point, a determined location of the mobile device, based on at least the first and second flight times of signals from at least the first and second access points, respectively, to the mobile device, and the locations of at least the first and second the access points.

An example embodiment of the invention is related to FIG. 3E Access point—Location Determination Using WiFi Timing Measurement Action Frame:

An apparatus, comprising:

at least one processor;

at least one memory including computer program code;

the at least one memory and the computer program code configured to, with the at least one processor, cause the apparatus at least to:

receive a Timing measurement action frame from a mobile device;

measure a first flight time of a signal between the first access point and the mobile device, in response to the Timing measurement action frame;

store the measured first flight time in a server coupled to the first access point;

receive a request from the mobile device to identify the location of the mobile device; and transmit a determined location of the mobile device, based on the measured first flight time of signals between the mobile device and the first access point and measured flight times of signals between the mobile device and other access points coupled to the server, and the locations of the first and other the access points, the other access points having received a Timing measurement action frame from the mobile device.

An example embodiment of the invention is related to FIG. 4D Mobile Device—Location Determination Using WiFi Timing Measurement Request Frame:

An apparatus, comprising:

at least one processor;

at least one memory including computer program code;

the at least one memory and the computer program code configured to, with the at least one processor, cause the apparatus at least to:

transmit to a first access point a timing measurement request frame, to enable the mobile device to measure a first flight time of a signal between the first access point and the mobile device;

transmit to a second access point a timing measurement request frame, to enable the mobile device to measure a second flight time of a signal between the second access point and the mobile device;

transmit a list of at least the first and second access points and the respective first and second measured flight times, to a location information server that will then determine the location of the mobile device;

transmit a request to a currently connected access point that is coupled to the location information server, to identify the location of the mobile device; and receive from the currently connected access point, the determined location of the mobile device, based on at least the first and second flight times of signals from at least the first and second access points, respectively, to the mobile device, and locations of at least the first and second the access points.

An example embodiment of the invention is related to FIG. 2C Mobile Device—Location Determination Using WiFi RSSI and/or RCPI:

A computer program product comprising computer executable program code recorded on a computer readable non-transitory storage medium, the computer executable program code comprising:

code for transmitting, by the mobile device, a request to the access point, to identify the location of the mobile device;

code for receiving, by the mobile device, a message requesting the mobile device to repeat the request after a comeback delay that is specified in the response message;

code for receiving, by the mobile device, a beacon measurement request from the access point, requesting the mobile device to perform a scan and report back to the access point a beacon measurement, the measurement request indicating a measurement time shorter than the comeback delay;

code for monitoring, by the mobile device, beacons received from the access point and beacons received from other access points within range, and measuring received signal strength indication (RSSI) and received channel power indication (RCPI) of the beacons received from the access point and the beacons received from other access points within range;

code for transmitting, by the mobile device, a beacon measurement report message to the access point, including the measurements of received signal strength indication (RSSI) and/or received channel power indication (RCPI) of the beacons received from the access point and the beacons received from other access points within range;

code for transmitting, by the mobile device, a subsequent request to the access point, to identify the location of the mobile device, the subsequent request being sent after the comeback delay that was specified in the response message from the access point;

code for receiving, by the mobile device, a location estimation message from the access point, including an estimation of the location of the mobile device, based on known locations of the access point and the other access points reported in the beacon measurement message and based on known approximate footprints of the access point and the other access points reported in the beacon measurement message.

An example embodiment of the invention is related to FIG. 2D Access point—Location Determination Using WiFi RSSI and/or RCPI:

A computer program product comprising computer executable program code recorded on a computer readable non-transitory storage medium, the computer executable program code comprising:

while a connection exists between a mobile device and an access point;

code for receiving, by the access point, a request from the mobile device, to identify the location of the mobile device;

code for transmitting, by the access point, a response message requesting the mobile device to repeat the request after a comeback delay that is specified in the response message;

code for transmitting, by the access point, a beacon measurement request to the mobile device, requesting the mobile device to perform a scan and report back to the access point a beacon measurement, the measurement request indicating a measurement time shorter than the comeback delay;

code for receiving, by the access point, a beacon measurement report message from the mobile device, including the measurements of received signal strength indication (RSSI) and/or received channel power indication (RCPI) of beacons received from the access point and beacons received from other access points within range of the mobile device;

code for receiving, by the access point, a subsequent request from the mobile device, to identify the location of the mobile device, the subsequent request being sent after the comeback delay that was specified in the response message from the access point; and code for transmitting, by the access point, a location estimation message to the mobile device, including an estimation of the location of the mobile device, based on known locations of the access point and the other access points reported in the beacon measurement message and based on known approximate footprints of the access point and the other access points reported in the beacon measurement message.

An example embodiment of the invention is related to FIG. 3D Mobile Device—Location Determination Using WiFi Timing Measurement Action Frame:

A computer program product comprising computer executable program code recorded on a computer readable non-transitory storage medium, the computer executable program code comprising:

code for transmitting, by a mobile device, to a first access point a Timing measurement action frame, to enable the first access point to measure a first flight time of a signal between the first access point and the mobile device, for storage of the first measured flight time in a server;

code for transmitting, by the a mobile device, to a second access point a Timing measurement action frame, to enable the second access point to measure a second flight time of a signal between the second access point and the mobile device, for storage of the second measured flight time in the server;

code for transmitting, by the mobile device, a request to a currently connected access point coupled to the server, to identify the location of the mobile device; and code for receiving, by the mobile device, from the currently connected access point, a determined location of the mobile device, based on at least the first and second flight times of signals from at least the first and second access points, respectively, to the mobile device, and the locations of at least the first and second the access points.

An example embodiment of the invention is related to FIG. 3E Access point—Location Determination Using WiFi Timing Measurement Action Frame:

A computer program product comprising computer executable program code recorded on a computer readable non-transitory storage medium, the computer executable program code comprising:

code for receiving, by a first access point, a Timing measurement action frame from a mobile device;

code for measuring, by the first access point, a first flight time of a signal between the first access point and the mobile device, in response to the Timing measurement action frame;

code for storing, by the first access point, the measured first flight time in a server coupled to the first access point;

code for receiving, by the first access point, a request from the mobile device to identify the location of the mobile device; and code for transmitting, by the first access point, a determined location of the mobile device, based on the measured first flight time of signals between the mobile device and the first access point and measured flight times of signals between the mobile device and other access points coupled to the server, and the locations of the first and other the access points, the other access points having received a Timing measurement action frame from the mobile device.

An example embodiment of the invention is related to FIG. 4D Mobile Device—Location Determination Using WiFi Timing Measurement Request Frame:

A computer program product comprising computer executable program code recorded on a computer readable non-transitory storage medium, the computer executable program code comprising:

code for transmitting, by a mobile device, to a first access point a timing measurement request frame, to enable the mobile device to measure a first flight time of a signal between the first access point and the mobile device;

code for transmitting, by the mobile device, to a second access point a timing measurement request frame, to enable the mobile device to measure a second flight time of a signal between the second access point and the mobile device;

code for transmitting, by the mobile device, a list of at least the first and second access points and the respective first and second measured flight times, to a location information server that will then determine the location of the mobile device;

code for transmitting, by the mobile device, a request to a currently connected access point that is coupled to the location information server, to identify the location of the mobile device; and code for receiving, by the mobile device, from the currently connected access point, the determined location of the mobile device, based on at least the first and second flight times of signals from at least the first and second access points, respectively, to the mobile device, and locations of at least the first and second the access points.

An example embodiment of the invention is illustrated in FIG. 4E Mobile Device—Location Determination Using WiFi Timing Measurement Request Frame:

A method, comprising:

transmitting, by a mobile device, to a first access point a timing measurement request frame, to enable the mobile device to measure a first flight time of a signal between the first access point and the mobile device;

requesting by the mobile device a location of the first access point;

transmitting, by the mobile device, to a second access point a timing measurement request frame, to enable the mobile device to measure a second flight time of a signal between the second access point and the mobile device;

requesting by the mobile device a location of the second access point;

transmitting, by the mobile device, to an Nth access point a timing measurement request frame, to enable the mobile device to measure a second flight time of a signal between the Nth access point and the mobile device;

requesting by the mobile device a location of the Nth access point;

determining, by the mobile device, its own location, based on at least the first and second flight times of signals from at least the first and second access points, respectively, and locations of at least the first and second the access points, the location being an intersection of resulting annular areas.

An example embodiment of the invention relates to FIG. 4E Mobile Device—Location Determination Using WiFi Timing Measurement Request Frame:

An apparatus, comprising:

at least one processor;

at least one memory including computer program code;

the at least one memory and the computer program code configured to, with the at least one processor, cause the apparatus at least to:

transmit to a first access point a timing measurement request frame, to enable the mobile device to measure a first flight time of a signal between the first access point and the mobile device;

request a location of the first access point;

transmit to a second access point a timing measurement request frame, to enable the mobile device to measure a second flight time of a signal between the second access point and the mobile device;

request a location of the second access point;

transmit to an Nth access point a timing measurement request frame, to enable the mobile device to measure a second flight time of a signal between the Nth access point and the mobile device;

request a location of the Nth access point;

determine its own location, based on at least the first and second flight times of signals from at least the first and second access points, respectively, and locations of at least the first and second the access points, the location being an intersection of resulting annular areas.

An example embodiment of the invention relates to FIG. 4E Mobile Device—Location Determination Using WiFi Timing Measurement Request Frame:

A computer program product comprising computer executable program code recorded on a computer readable non-transitory storage medium, the computer executable program code comprising:

code for transmitting, by a mobile device, to a first access point a timing measurement request frame, to enable the mobile device to measure a first flight time of a signal between the first access point and the mobile device;

code for requesting by the mobile device a location of the first access point;

code for transmitting, by the mobile device, to a second access point a timing measurement request frame, to enable the mobile device to measure a second flight time of a signal between the second access point and the mobile device;

code for requesting by the mobile device a location of the second access point;

code for transmitting, by the mobile device, to an Nth access point a timing measurement request frame, to enable the mobile device to measure a second flight time of a signal between the Nth access point and the mobile device;

code for requesting by the mobile device a location of the Nth access point;

code for determining, by the mobile device, its own location, based on at least the first and second flight times of signals from at least the first and second access points, respectively, and locations of at least the first and second the access points, the location being an intersection of resulting annular areas.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable non-transitory medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

The invention claimed is:

1. A method, comprising:
   while a connection exists between a mobile device and an access point;
   receiving, by the access point, a request from the mobile device, to identify the location of the mobile device;
   transmitting, by the access point, a response message requesting the mobile device to repeat the request after a comeback delay that is specified in the response message;
   transmitting, by the access point, a beacon measurement request to the mobile device, requesting the mobile device to perform a scan and report a beacon measurement back to the access point, the beacon measurement request indicating a measurement time shorter than the comeback delay;
   receiving, by the access point, a beacon measurement report message from the mobile device, including at least a first measurement of at least one of a received signal strength indication or a received channel power indication of beacons received by the mobile device from the access point and at least a second measurement of at least one of a received signal strength indication or a received channel power indication of beacons received by the mobile device from at least one other access point within range of the mobile device;
   estimating, by the access point, before expiration of the comeback delay, the location of the mobile device, based on known locations of the access point and the at least one other access point reported in the beacon measurement report message and based on known approximate footprints of the access point and the at least one other access point reported in the beacon measurement report message,
   receiving, by the access point, at a time corresponding to expiration of the comeback delay, a subsequent request from the mobile device, to identify the location of the mobile device, the subsequent request; and
   transmitting, by the access point, a location estimation message to the mobile device, including an estimation of the location of the mobile device, based on known locations of the access point and the at least one other access point reported in the beacon measurement report message and based on known approximate footprints of the access point and the at least one other access point reported in the beacon measurement report message.

2. The method of claim 1, wherein the access point and the at least one other access point comprise hotspots that are not operated by the same operator and do not share a common location data base.

3. The method of claim 1, wherein the estimation of the location further based at least on the first and second measurements.

4. The method of claim 1, wherein the estimation of the location is performed by the access point or a server connected to the access point.

5. An apparatus, comprising:
   at least one processor;
   at least one memory including computer program code;
   the at least one memory and the computer program code configured to, with the at least one processor, cause the apparatus at least to:
   receive a request from a mobile device, to identify a location of the mobile device;
   transmit a response message requesting the mobile device to repeat the request after a comeback delay that is specified in the response message;
   transmit a beacon measurement request to the mobile device, requesting the mobile device to perform a scan and report a beacon measurement back to the apparatus, the beacon measurement request indicating a measurement time shorter than the comeback delay;
   receive a beacon measurement report message from the mobile device, including at least a first measurement of at least one of a received signal strength indication or a received channel power indication of beacons received by the mobile device from the apparatus and at least one second measurement of at least one of a received signal strength indication or received channel power indication of beacons received from at least one other access point within range of the mobile device;
   estimate before expiration of the comeback delay, the location of the mobile device, based on known locations of the apparatus and the at least one other access point reported in the beacon measurement report message and based on known approximate footprints of the apparatus and the at least one other access point reported in the beacon measurement report message;
   receive, at a time corresponding to expiration of the comeback delay, a subsequent request from the mobile device, to identify the location of the mobile device; and
   transmit a location estimation message to the mobile device, including an estimation of the location of the mobile device, based on known locations of the apparatus and the at least one other access point reported in the beacon measurement message and based on known approximate footprints of the apparatus and the other access points reported in the beacon measurement message.

6. The apparatus of claim 5, wherein the estimation of the location further based at least on the first and second measurements.

7. The apparatus of claim 5, wherein the estimation of the location is performed by the apparatus or a server connected to the apparatus.

8. A non-transitory computer program product comprising computer executable program code recorded on a computer readable non-transitory storage medium, the computer executable program code comprising:
   code for receiving, by an access point, a request from a mobile device, to identify a location of the mobile device;
   code for transmitting, by the access point, a response message requesting the mobile device to repeat the request after a comeback delay that is specified in the response message;
   code for transmitting, by the access point, a beacon measurement request to the mobile device, requesting the mobile device to perform a scan and report back a beacon measurement to the access point, the measurement request indicating a measurement time shorter than the comeback delay;
   code for receiving, by the access point, a beacon measurement report message from the mobile device, including at least a first measurement of at least one of a received signal strength indication or a received channel power indication of beacons received by the mobile device from the access point and at least one second measurement of at least one of a received signal strength indication or a received channel power indication of beacons received from other access points within range of the mobile device;

code for estimating by the access point, before expiration of the comeback delay, the location of the mobile device, based on known locations of the access point and the at least one other access point reported in the beacon measurement report message and based on known approximate footprints of the access point and the at least one other access point reported in the beacon measurement report message;

code for receiving, at a time corresponding to expiration of the comeback delay, by the access point, a subsequent request from the mobile device, to identify the location of the mobile device; and code for transmitting, by the access point, a location estimation message to the mobile device, including an estimation of the location of the mobile device, based on known locations of the access point and the at least one other access point reported in the beacon measurement report message and based on known approximate footprints of the access point and the at least one other access point reported in the beacon measurement report message.

9. The computer program product according to claim 8, wherein the code is executed only while a connection exists between the mobile device and the access point.

10. The computer program product of claim 8, wherein the estimation of the location further based at least on the first and second measurements.

11. The computer program product of claim 8, further comprising: code for estimating the location of the mobile device by the access point or code for receiving the estimation of the location of the mobile device from a server connected to the access point.

* * * * *